US008624177B2

(12) United States Patent  (10) Patent No.: US 8,624,177 B2
Campion et al.  (45) Date of Patent: Jan. 7, 2014

(54) REFINED OPTICAL SYSTEM

(76) Inventors: David Campion, Agoura Hills, CA (US); David M. Kane, Tuscon, AZ (US); Nicholas Dwork, Santa Clarita, CA (US); Matthew Pohlman, Moorpark, CA (US); Randall Potter, Northridge, CA (US)

( * ) Notice: Subject to any disclaimer, the term of this patent is extended or adjusted under 35 U.S.C. 154(b) by 647 days.

(21) Appl. No.: 12/456,504

(22) Filed: Jun. 16, 2009

(65) Prior Publication Data

US 2010/0314534 A1   Dec. 16, 2010
US 2013/0313418 A9   Nov. 28, 2013

Related U.S. Application Data

(63) Continuation of application No. PCT/US2007/025912, filed on Dec. 17, 2007.

(60) Provisional application No. 60/920,230, filed on Mar. 27, 2007, provisional application No. 60/875,103, filed on Dec. 16, 2006.

(51) Int. Cl.
   *G01D 18/00*  (2006.01)
(52) U.S. Cl.
   USPC ............................................ 250/252.1
(58) Field of Classification Search
   USPC ............................................ 250/252.1
   See application file for complete search history.

(56) References Cited

FOREIGN PATENT DOCUMENTS

WO    WO 2006076474 A1 *  7/2006

* cited by examiner

*Primary Examiner* — David Porta
*Assistant Examiner* — Hugh H Maupin
(74) *Attorney, Agent, or Firm* — Furman IP Law

(57) ABSTRACT

Selected scene regions are imaged. IMAGING CHANNEL: mirrors (preferably MEMS) address an imaging sensor to regions. CALIBRATION CHANNEL: the mirrors direct radiation from a source to a calibration sensor, along an imaging-channel segment. Beam splitter(s) let the channels share optical path at the mirrors. To minimize imaging-channel diffractive blur, the calibration channel modifies wavefront angle and smoothness at the mirrors—measuring (and setting mirrors to optimize) PSF sharpness, then applying these measurements (and settings) to optimize imaging-channel settings by iterative multidimensional gradient search. An afocal lens receives scene radiation, magnifying deflection at the scene. An FOR is imaged on the imaging sensor; the mirrors address the sensor to a narrow FOV within the FOR; the lens enlarges deflections to cover the FOR. Plural diffraction-grating orders communicate between calibration source and sensor when the selected region is in plural scene portions, regardless which FOV is addressed.

14 Claims, 15 Drawing Sheets

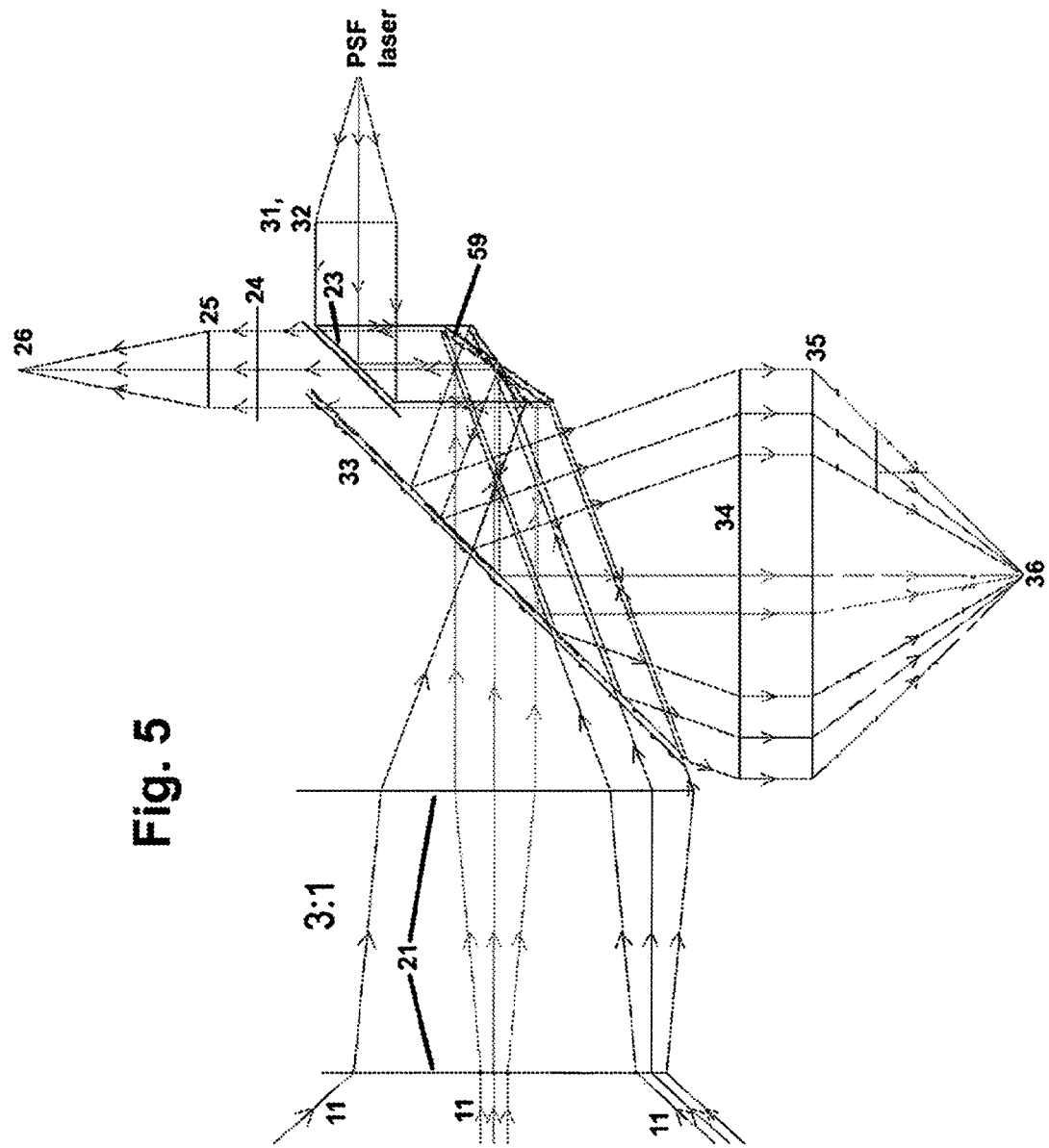

imaging channel →
PSF (WEC) channel --→

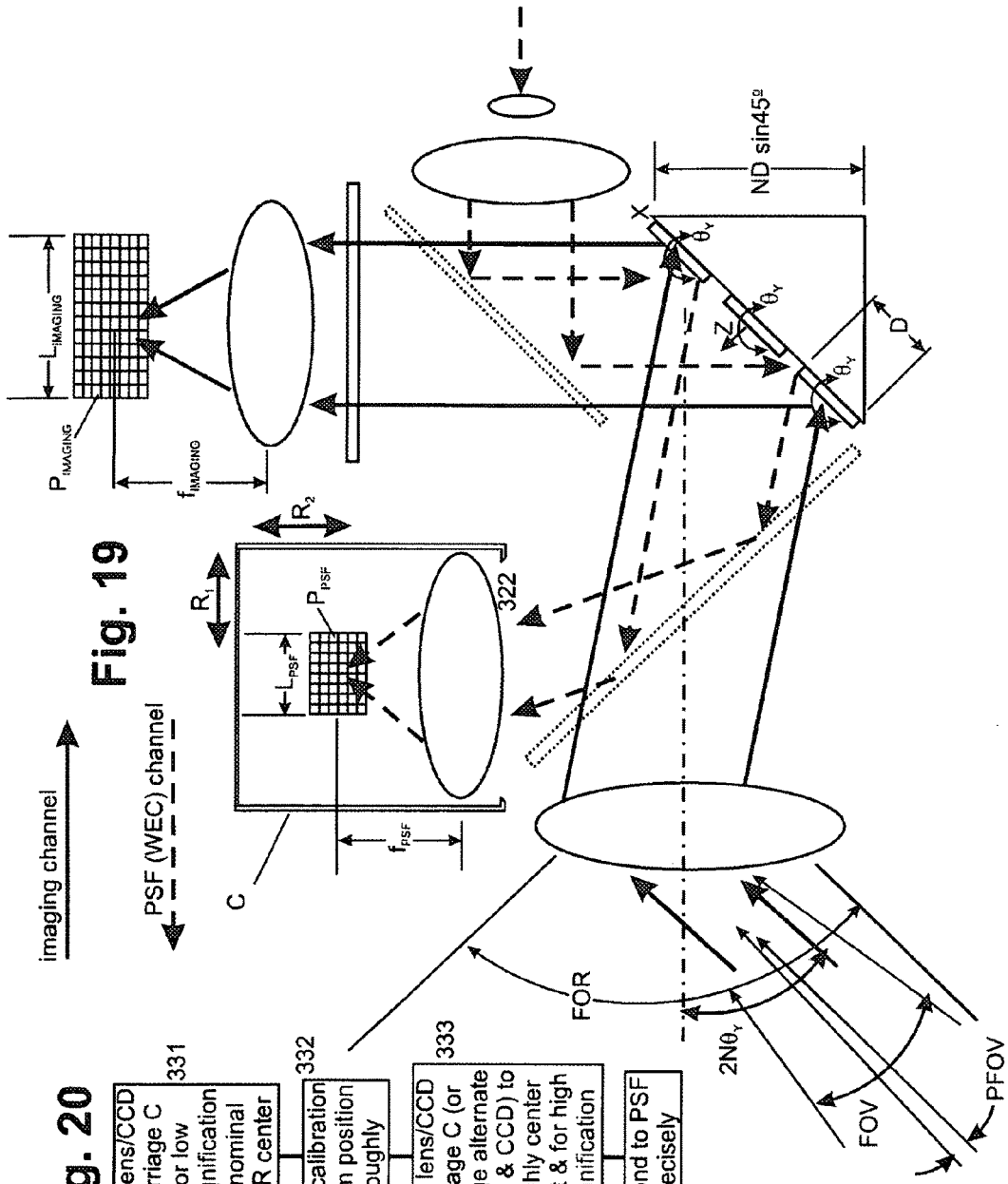

REFINED OPTICAL SYSTEM

RELATED DOCUMENTS

This application is a continuation under 35 U.S.C. 120 of international application number PCT/US2007/025912 filed Dec. 17, 2007 (published WO/2008/076444) which claims benefit under 35 U.S.C. 119(e) to two provisional applications, U.S. provisional application 60/875,103 filed Dec. 16, 2006, and U.S. provisional application 60/920,230 filed Mar. 27, 2007.

FIELD OF THE INVENTION

This invention relates generally to imaging, and more specifically to sharp imaging of small details in a large scene.

BACKGROUND

Some conventional optical systems and methods for accomplishing this task define two nested fields within which imaging is desired: a field of view ("FOV"), the largest scene or area which an optical system can take in all at once; and a so-called "field of regard" ("FOR") that is considerably larger. The FOR defines an entire region which is to be imaged, but by definition cannot be imaged all at once.

Accordingly the FOV is successively moved around, in the FOR, so as to image portions of the FOR a little at a time—and conventionally this is done by bodily moving the whole optical system. Such motion is achieved by mounting the entire optical system in a gimbal box so that the optics (and the FOV) can be pointed in any direction within the FOR, and operating hand mechanisms or electrical motors to change the pointing direction.

Manual operation is a particularly good solution for price and reliability, and also when it is desirable to direct attention toward scene details whose shape or color is not known in advance, since humans are particularly well adapted to noticing such things. If it is desired to canvass an entire scene very quickly, however, then manual operation of the gimbal box tends to come up short—and greater interest is directed to automatically controlled motors.

With such motors, on the other hand, come many additional undesired elements of extremely great cost and complexity: first, the gimbal box must be provided with fittings, gears etc. for compatibility with automatic operation by the motors; second, the electrical control signals to drive the motors must be somehow programmed to move the gimbal box in such a way as to repetitively scan the FOV within the FOR (for example, but not necessarily, in a raster pattern), missing no part of the FOR; and third, ideally the system is adapted to react when a scene detail of particular interest is noticed—again, either by humans or by automatic recognition equipment.

Once again, human vision is particularly inexpensive and effective when the scene and details of greatest interest are in fact visible; however, this last condition cannot always be guaranteed. In any event the modern desire for rapid imaging and inspection of an entire scene tends to demand automaticity in detail recognition as well as gimbal maneuvering.

Still further in the listing of additional extreme cost and complexity: fourth, the automatic motor control should also be adapted to halt or pause in the repetitive scanning, and direct the FOV specifically toward a particularly interesting scene detail that has been noticed; and fifth, even when that redirection is occurring some sort of ongoing background scan of the entire scene continues to be desirable. Such redirection with ongoing scan, too, can be programmed—but as will be understood such programming is inordinately complex and difficult.

One factor that makes such operation almost completely impractical is the mass and weight of the optical system itself. Automatic control of motors driving a gimbal box that houses an entire optical system calls for powerful, high-torque motors—and therefore high electrical currents, and in turn therefore large-capacity power supplies and finally automatic controllers that are capable of rapidly modulating such high currents from such large power supplies.

Accordingly, even though the technology that has been described might be regarded as relatively primitive, and the available response times from such technology are rather poor, at the same time the cost is all but prohibitive. The gimbal system, with its fine mountings, high-precision motors, extreme power characteristics, and great programming demands, is the primary cost driver and performance limiter for many fine-imaging systems—especially systems requiring a large FOR, and even more so if broad spectral response is also desired.

As already suggested, gimbals furthermore limit system performance. The gimbal system itself must be of relatively massive construction, leading to mechanical resonances that are of low frequency, and these dictate control-electronics bandwidth that is similarly low.

Therefore the gimbals cannot track high-frequency disturbances, even from nearby equipment, and the optics are thereby left vulnerable to jitter—which undesirably smears the image. Gimbals even escalate the size, weight and power requirements for apparatus needed simply to transport the optical system and its gimbal box from one place to another.

The earlier patent documents mentioned above introduce alternatives to gimbals for maneuvering an FOV within a very broad FOR. Certain of these alternatives emphasize devices that are in some ways analogous to the deformable mirrors known in very large astronomical telescopes. Those devices emphasized in the above-mentioned patent documents, however, also have major advantages over such deformable mirrors, as will be seen in a later section of this document.

Historically, a deformable mirror ("DM") consisted of a monolithic reflective face-sheet that had an array of actuators—which deformed the face-sheet through the application of force normal to the face-sheet, or torque, or both, in order to correct for spurious optical-wavefront irregularities. Thus conventional DMs are particularly intended to achieve very fine diffraction-limited imaging, rather than to maneuver an FOV within an FOR; however, the diffraction limit can be of distinct interest for present purposes as well.

Whether located at a primary mirror or at another optical pupil, as in the active-imaging ("AI") telescope on Haleakala, conventional DMs have several limitations—discussed at some length in the above-mentioned documents—most particularly minimal ability to direct the sensor FOV within a large FOR.

Also discussed in those documents are some known technologies for wavefront sensing and analysis, used to collect information for operating a DM to improve imaging sharpness. Such sensing techniques generally measure and report modulo $2\pi/\lambda$ phase, with the goal of returning diffraction performance to a theoretical ideal. Four wavefront-sensing methodologies are:

the Shack-Hartmann wavefront sensor, in which a microlens array focuses the wavefront on a focal-plane array, from which a wavefront reconstructor develops a wavefront map that in turn is used to create a DM-actuator command set;

a stochastic-based image-quality sensor, such as developed by Weyrauch et al., that evaluates the system image quality directly for a point source—continually training itself to achieve a desired image metric, such as maximizing or minimizing the intensity of a laser beam that is detected behind a pinhole—by perturbing each element in a DM of the MEMS-array type (see below) and interpreting the resulting influence upon the metric; Weyrauch teaches no technique for wavefront corrections in a system operating over a very wide angular FOR;

somewhat analogously to the Weyrauch work, iteratively minimizing the radius of an image point-spread function ("PSF")—described in other literature, but apparently not in the environment of a MEMS array;

the pixelated phase-mask dynamic interferometer, which acquires a phase-shifted interferogram in a single camera frame, yielding at each image point a phase difference between two radiation beams;

a shearing wavefront sensor, consisting of a grating in the image plane—where the DM, actually at an image pupil, is reimaged—that has been used for both segment phasing and slope correction for extended complex scenes as well as a point source, and potentially high bandwidth.

The Weyrauch development is reported in T. Weyrauch, M. A. Vorontsov, T. G. Bifano, J. A. Hammer, M. Cohen, and G. Cauwenberghs, "Microscale Adaptive Optics Wavefront Control with a Micro-Mirror Array and a VLSI Stochastic Gradient Descent Controller," 40 *App. Opt.* 4243-53 (2001).

Components not ordinarily associated with high-quality imaging technology—Three kinds of devices are discussed here:

Microelectromechanical Systems ("MEMS") Mirror Array

These are the above-mentioned devices which are in some ways analogous to DMs. The first significant commercial use of MEMS mirrors was in the Texas Instruments Digital Light Projector (DLP) MEMS array. Formed in an array of 1 k×1 k two-axis 10 μm mirrors, the bistable mirrors were controlled open-loop, with the mirrors stepped from ±10° locations at rates on the order of 10 μs per step.

Apart from the coowned patent documents mentioned above, to the best of our knowledge the use of MEMS mirrors analogously to DMs has been reported only with wavefront sensors to drive the corrections. In the wavefront-sensor context it is conventionally not shown how to obtain corrections over a very wide angular range of field locations—i.e., within a large FOR.

This limitation is severe if it is desired to provide a system that can monitor a FOR of 60 to 100° or more. Furthermore, even if this limitation were overcome, available MEMS mirrors would not have been adequate to the task.

The DLP mirrors, for example, could only operate in the tip and tilt directions. They were not capable of so-called "piston" movements—i.e., linear motion in or out relative to the overall mirror-array backplane.

Tip and tilt adjustments are desirable for matching wavefront slopes (as well as beam pointing), but piston adjustment too is usually needed to compensate the rectilinear, stepwise profile of a wavefront. In a MEMS array, furthermore, when the mirrors are rotated to point an image or FOV in a particular direction, wavefronts are disturbed by rotation-generated offsets between the planes of adjacent individual mirrors—especially when the offsets are significant in comparison with the wavelength of the incident light.

Furthermore the DLP mirrors were not analog or even multistate binary—i.e., each mirror could take on only one of two positions about each axis. Wavefront correction typically calls for adjustment to rather small fractions of a wavelength; therefore either analog or fine-granularity multilevel binary operation is usually needed.

A more closely related development in MEMS scan-mirror arrays was in the area of optical switching; here the mirrors could be controlled open-loop about one or two axes over the entire range of mirror travel, and thus were "analog" in the sense of being able to point the mirror in generally arbitrary directions.

Examples of this technology include optical switches from Lucent and from Calient Networks. These arrays are typically larger, hundreds of micrometers to ones of millimeters—but have millisecond-level step response characteristics because they are controlled open loop.

Also, areal densities of these arrays are low, less than fifty percent. Therefore significant modifications to their architecture are required to obtain an adequate DM for any sort of adaptive optical system.

Liquid Lenses

The cellular-telephone industry has developed a lens assembly that can actively vary focal length over the angular extent of the FOV, particularly for use in cellular-phone cameras. It is a fluidic-based lens, providing a zoom capability. One such report of interest is B. Hendriks, S. Kuiper, "Variable-focus liquid lens for miniature cameras", 85 *Applied Physics Letters* No. 7, August 16.

This development may be useful for present purposes, particularly if an infrared-transmitting fluid can be used. Given the challenge of wavelength specificity as will become clear below, this approach is not viewed as a likely solution.

Spatial Light Modulators (SLMs)

SLMs come in two basic configurations, which very roughly compensate wavefront error by fitting the error through discrete piecewise phase steps. Some SLM arrays consist of mirrors that are adjustable in-and-out, i.e. in piston.

An SLM is not the same thing as a MEMS array, and the two should not be confused. Among several important differences, an SLM moves in piston only, and so can only be adjusted to compensate the stepwise profile, not the continuous slopes, of an incoming light-beam wavefront.

Lucent Technology is understood to be working on a several-million-element SLM device, and Boston Micro Machines has produced smaller ones. While SLMs are certainly part of the DM field, they cannot be associated with DMs of highest precision.

This is because, as noted above, they operate only in piston. Lacking tip and tilt capability, they do a fair job of compensating for wavefront offsets only, in sawtooth fashion (analogous to the so-called "aliasing" in computer images), but not in matching wavefront slopes. Ironically this deficiency is precisely opposite to the above-described limitation of MEMS arrays heretofore—i.e. tip and tilt only, with no piston.

Furthermore even the SLM piston excursion that is available, per actuator, is not high enough to provide the necessary offsets, without an inordinately high actuator density. As will later be seen, the density of actuators required for fully satisfactory wavefront matching, in piston, is almost impractically extreme.

CONCLUSION

From the foregoing it can be seen that no prior art provides mechanisms capable of economical, practical (e. g. lightweight and low-power), substitution for the conventional optical-system gimbal box. Such devices are greatly needed for very rapid and accurate FOV scanning or pointing within a larger FOR.

While conventional MEMS arrays might seem to qualify, such arrays fail in that they introduce—and cannot correct for—significant wavefront errors. In addition MEMS arrays can produce only an undesirably very small deflection range.

Furthermore as noted above it has not been shown how to obtain wavefront corrections in wide-angle-FOR systems—either with a MEMS array or in stochastic systems like Weyrauch's, or in PSF-driven correction approaches. Thus important aspects of the technology used in the field of the invention remain amenable to useful refinement.

BRIEF SUMMARY OF THE INVENTION

The present invention introduces just such refinement. In preferred embodiments the invention has several independent aspects or facets, which are advantageously used in conjunction together, although they are capable of practice independently.

In preferred embodiments of its independent facets or aspects, the features and benefits of the invention are substantially as defined by and inherent in the appended claims—subject to modification in any application claiming priority from this document.

Those features and benefits of the invention will be more fully appreciated from the following detailed description of preferred embodiments—with reference to the appended drawings, of which:

BRIEF DESCRIPTION OF THE DRAWINGS

FIG. 5 is an optical layout diagram of an AMBS paraxial system design for use in the FIG. 1 system (the PSF subassembly is folded downward here, though upward in FIG. 1);

FIG. 19 is another apparatus for accommodating calibration-channel rays corresponding to extreme field positions without a diffraction grating; and FIG. 20 is a flow-chart of a procedure for using the FIG. 19 apparatus.

DETAILED DESCRIPTION OF PREFERRED EMBODIMENTS

As a replacement for gimbals, MEMS-mirror arrays can be adapted to eliminate their above-mentioned limitations—and thereby yield fine but fast imaging over a very wide field of regard ("FOR"—as defined in the earlier "BACKGROUND" section), and also over a broad spectral range if desired. The preferred embodiments described in this document are believed to be very closely related to the afocal MEMS beam-steering ("AMBS") and wavefront-correction innovations reported in the above-mentioned and coowned earlier patent applications, all but one already published at the time of this writing.

In particular, those earlier documents show that the angular-deflection limits of a MEMS array are amply overcome by incorporation of an afocal element to magnify the effects of the mirror deflections. The earlier documents also show that excellent wavefront compensation is available through use of a Shack-Hartmann or other wavefront sensor to derive a corresponding matrix of control-signal perturbations for the MEMS array. Preferred embodiments of the present invention particularly provide alternative methods and apparatuses for performing the wavefront-compensation part of this same quality-imaging technology.

Figure 1:
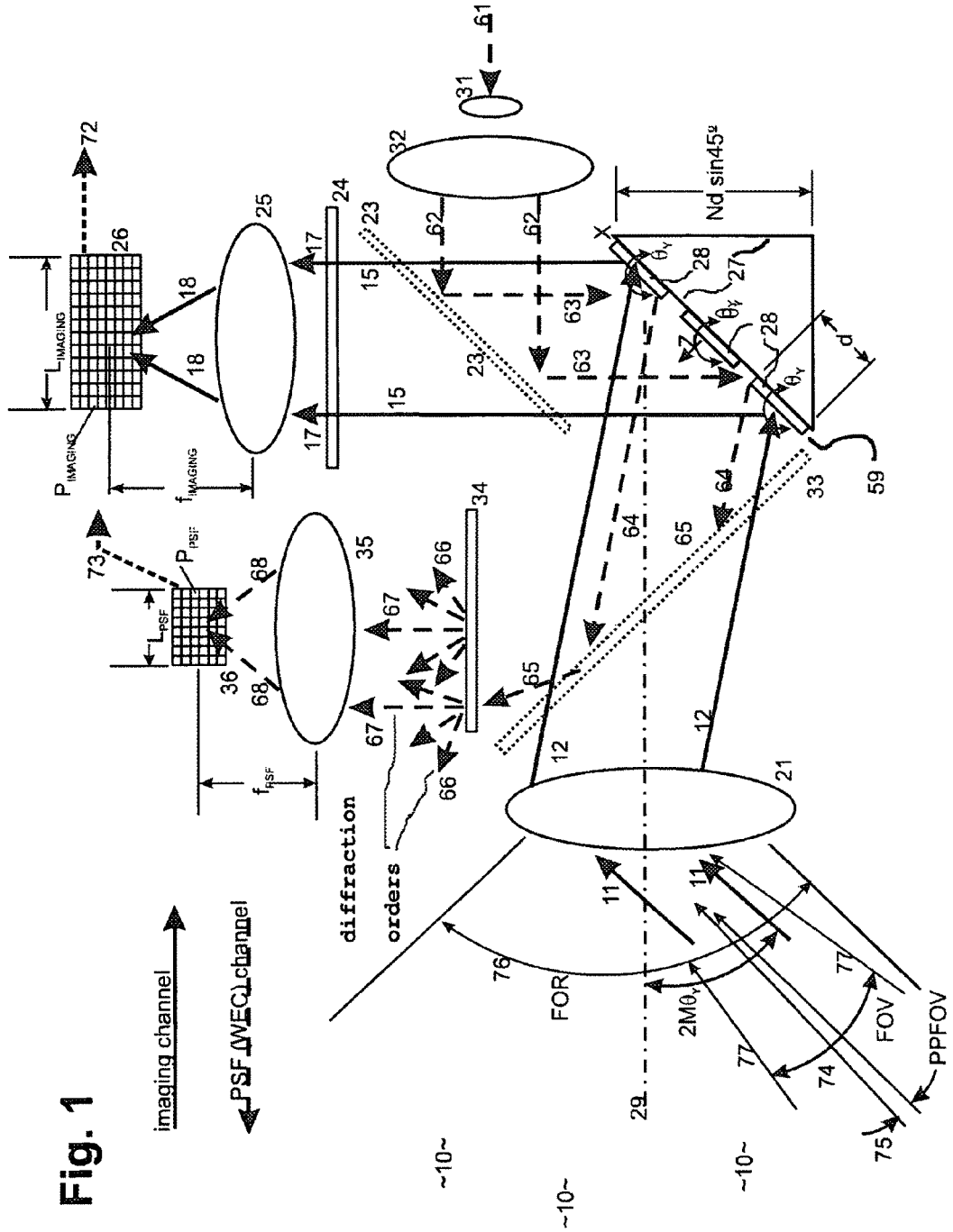
FIG. 1 is a functional overview optical diagram, highly schematic, showing a preferred embodiment of the refined optical system of our invention.

Central to preferred embodiments of our novel AMBS system is a MEMS scan-mirror array 59 (FIG. 1) in which each mirror is controlled in tip $\theta_X$, tilt $\theta_Y$ and piston Z to point optical beams that image external scenes. The mirror array is also controlled in such a way as to refine the pointing process as will be seen. Examples of special MEMS mirrors for use in this system appear in the previously mentioned patent documents.

To-date we have actually operated only mirrors that operate in tip and tilt—i.e., angularly—but our units for preferred embodiments of the present invention operate in piston also, and are expected to provide essential design information for both the hardware and the control algorithm. Details of the AMBS system as well as the MEMS array are taken up below.

Our refined AMES system consists of two channels: an imaging channel 11, 12, 15, 17, 18 (FIG. 1) carrying incoming irradiance 11 of an external scene 10, and a somewhat incidental wavefront-calibration channel 62-68 that carries only an internal radiation beam 61. This latter beam, as will be detailed later in this document, is used merely to help fine-tune electronic control signals 71 (FIGS. 12, 13 which drive the MEMS array.

The main function of the imaging channel is simply to address and image, at each moment, a desired relatively narrow external field of view ("FOV") 74. The optical system includes a detector 26 that is sensitive within the FOV, by virtue of the afocal lens assembly 21.

The MEMS mirrors 28, however, variably point this relatively narrow sensitive field within a larger field that we call the field of regard ("FOR") 76. Thus, as will be understood, the MEMS array 59 (mirrors 28 with their backplate and support structure 27) cooperates with the afocal assembly 21 to perform the prior-art functions of a conventional servocontrolled gimbal system: this is at the heart of preferred embodiments of the present invention.

DETAILS OF THE IMAGING CHANNEL—In the imaging channel, light 11 from a scene 10 enters the afocal lens assembly 21. As indicated above, this assembly—which equivalently takes the form of a reflective optic, or a hybrid refractive and reflective element—magnifies the overall FOR 76 in which the sensitive FOV 74 of the system can be maneuvered by the MEMS scan mirror array 59.

As a practical matter the maximum optical-scan angles that can be achieved by the MEMS mirrors alone are in the range of, roughly, plus-or-minus ten to fifteen degrees. Preferred embodiments of the invention, however, include an afocal optic with a magnification M of three to five, to enable addressing the FOV into a larger FOR of interest.

A reimaging optic 25 receives light from the afocal optic 21, via the MEMS array 59, and forms an image of the external scene onto the system main detector 26. This light 12 propagating from the afocal optic 21 toward the reimaging lens is collimated, in the sense that its rays (before traversing the reimager) never converge to a focus; thus the term "afocal," or "without focus."

The two-axis MEMS scan-mirror array 59 is preferably a 32-by-45-element array with 1 mm square mirrors. These values represent the nominal requirement for an operational system according to preferred embodiments of the invention.

This mirror array 59 is placed behind the afocal assembly 21. Individual mirrors 28 in the array rotate about $\theta_X$ and $\theta_Y$, pointing the sensor FOV 75 as desired within the larger, overall desired FOR 76.

The still-collimated beam 15 from the mirrors then traverses a spectral filter 23, for example a dichroic beam splitter or Fabry-Perot etalon, which limits the wavelength band. This wavelength constraint simply makes the fine-tuning of the mirror control signals more effective. That is, the control signals cannot be optimized for passage of a broad spectral waveband all at once through the system; however, the system is capable of handling a broad bandwidth in a stepwise manner.

The light from any objects of interest in the FOV is then reimaged by the previously mentioned reimager 25 onto a focal plane 26 that is identical or substantially congruent with the detector. Simultaneously, the entire focal plane 26 and detector can address the FOV 74 while each pixel $P_{IMAGING}$ within the detector 26 and its focal plane can address a per-pixel FOV (herein, "PPFOV") that is limited by the imaging-system performance.

One option for detailed design of the reimaging optic 25 is a liquid lens developed originally for cellular-telephone cameras. This type of lens, mentioned earlier, is amenable to active control of the focal length over the angular extent of the FOV. This capability may be useful in still further fine tuning of the mirror array and its control signals, as detailed later in this document.

Basic optical relationships for preferred embodiments of our novel AMBS system, and the associated variables for these equations, are defined thus:

M afocal-optic magnification
p pixel size at detector (focal-plane array)
$f_R$ focal length of reimaging optic
L length of square detector
θ half mechanical scan angle of MEMS mirror (two orthogonal axes)
N number of MEMS scan mirrors along an axis
d length (i.e. side dimension) of single, square MEMS scan mirror PPFOV per-pixel FOV in object space (diffraction limited)
FOV field of view in object space
FOR minimum field of regard for MEMS mirror at 45° initial orientation to optic axis, in object space
$d_{EP}$ sensor entrance-pupil diameter $$PPFOV = \frac{2 \cdot 44 M\lambda}{Nd\sin 45°} \quad \text{Eq. 1}$$

$$FOV = 2M\arctan\frac{L}{2f_x} \quad \text{Eq. 2}$$

$$FOR = 4M\theta_x \sin 45° \quad \text{Eq. 3}$$

$$d = Nd\sin\frac{45°}{M} \quad \text{Eq. 4}$$

Under control of a complete set of individual-mirror tip, tilt and piston signals, the MEMS scan mirrors move in a coordinated way, addressing the sensitive detector area to selected FOVs over the entire FOR rapidly—e. g. within hundreds of microseconds. Closed-loop control of the mirrors points them all in the same direction.

REASONS FOR PROVIDING THE CALIBRATION CHANNEL—The previously mentioned patent documents discuss an obscure problem of signal quality that cannot arise in large-single-mirror systems pointed by gimbals. Rotation of the mirrors in the array, to address the FOV to different locations within the FOR, introduces a very tiny optical phase difference between rows or columns of mirrors, and thus in some parts of the array also between individual mirrors.

Initially this phase difference may be considered a very minor matter, since the individual mirrors do indeed all point in a correct, and common, direction. Each small portion of the image (e. g., each pixel) therefore corresponds to an incremental small bit of the scene, and is correctly positioned among all the other small image portions.

Furthermore not only the positions but also the tonal values at each small portion of the image correspond very nearly to those of the scene. This is true despite the extremely small phase differences between mirrors, or mirror rows or columns.

These differences can be significant, however, in slightly degrading the sharpness of the image. Such reduction in sharpness occurs because the phase differences degrade the diffraction limit of the mirror array—and this in turn affects the spatial resolution of the optical system.

More specifically, when the mirrors are all adjusted into a common planar configuration, the diffraction limit, which is to say the spatial resolution, is established by the overall dimension Nd (as defined above, see FIG. 1) of the entire mirror array. When this relatively large mirror-aperture dimension sets the diffraction limit, that limit is very small—i.e. the resolution is especially fine. When phase differences occur, however, in regard to diffraction the mirror array can no longer behave as a common unitary mirror.

As to diffraction performance the array then behaves as a large number of much smaller mirrors: the diffraction limit is then established by the individual dimension d of a single mirror. When this relatively small aperture dimension sets the diffraction limit, that limit becomes significantly larger—i.e. the resolution is coarser, generally in relation to the number N of mirrors along the array dimension under consideration.

Although this proportion is roughly thirty or forty, even this coarser resolution remains comparable to or better than that of earlier, gimbal-type systems. People skilled in this field will understand, moreover, that these effects are meaningful only if important objects in the scene happen to be within the range of sizes and distances that can be sharply imaged with the finer resolution but not with the coarser. Even for objects within that range, these adverse effects upon diffraction can be substantially eliminated or very greatly mitigated through the teachings of the two above-mentioned patent applications.

Those provisions modify the wavefront phase differences by directly setting the Z positions of all the mirrors. The strategy is to maintain each optical phase difference at modulo $2\pi$ for the wavelength of interest, as a function of MEMS scan angle.

It is neither necessary nor possible to completely eliminate the phase difference, as this requires that the mirrors all be aligned in a single common plane—which would preclude pointing the FOV toward desired locations within the FOR. Fortunately, however, driving the mirrors in or out (in piston) to make all the phase differences very nearly integral multiples of $2\pi$ is sufficient to eliminate the adverse effects upon resolution.

The previously mentioned patent documents also teach control of wavefront slope discontinuities due to mirror-to-mirror angular misalignment. These additional adjustments produce a yet-smoother wavefront, which further improves the diffraction limit and yields finer resolution.

With the wavefront-adjustment techniques described in those earlier applications, the total size of the array—not the size of the individual mirrors—also determines the number of photons collected. The photometric efficiency is thereby enhanced.

According to those patent applications the wavefront adjustments are made in response to measurements using a wavefront sensor that directly determines phase differences and slope discontinuities. That technique is very satisfactory, and can be further understood from another physical model: the wavefront-sensor enables correction of a point-spread function ("PSF").

A point-spread function is a two dimensional distribution of optical energy from a point source into (most typically) a focal plane or detector plane, resulting from perturbations of transmission between the source and the plane. The PSF is sometimes regarded as a so-called "probability density" over the detector plane, primarily in the neighborhood of a hypothetical ideal projection of the source point into the plane.

In general, the more tightly contracted the PSF, the better the imaging of any other optical source through the same assemblage of perturbations—which is to say, the imaging of any other object through substantially the same optical system. Hence it can be expected that in the wavefront-sensing techniques for mirror-array adjustments, one way of visualizing or evaluating the favorable results—after the adjustments have been made—would be to project radiation from a point source to the imaging detector, and directly image or measure the resulting scatter pattern, i.e. the PSF.

DETAILS OF THE CALIBRATION CHANNEL—In those wavefront-sensing systems, in fact no PSF observation or PSF measurement is performed. An alternative approach, which is of interest according to preferred embodiments of the present invention, is in essence the opposite: namely, to proceed without a wavefront sensor and instead directly measure and evaluate the PSF itself.

This is the purpose of the previously mentioned calibration channel 62-68. The strategy can be either to:

(a) simply minimize the overall areal extent of the PSF; or (b) instead match such a construct to a size and shape that is expected on the basis of known information about the source.

For either strategy, the area of the PSF or its size and shape can be measured by any of various straightforward techniques. These include formation of weighted-average centroids or other areal mathematical constructs that represent the PSF position, shape and effective size.

The former strategy (minimizing the PSF area) is perhaps most appropriate for a point source, or in situations in which the source is a remote object and little is known about its true shape and size. The latter appears best if the source is a known shape, particularly an arbitrarily generated test pattern or one that emanates from a distinctly shaped slit or mask.

In either case an ideal strategy most typically involves determining contributions to the PSF size and shape from each of the individual MEMS mirrors—leading eventually to a matrix of tip, tilt and piston control-signal sets, one three-component set for each mirror. Such a matrix serves as a total, multidimensional control-signal set, or what may be called a signal "vector", that optimizes the PSF.

Where rapidity of mirror fine-tuning is important, preferred embodiments of the invention can emphasize algorithms that quickly produce a good PSF and good control-signal matrix, and corresponding good—but not necessarily the best possible—resolution. After that has been done, or more generally when more time is available, a better PSF, control-signal matrix and resolution can be found by iterative optimization.

Such a procedure can, for example, successively explore the full complex of interactions between different regions of the mirror array and different areal portions of the PSF. The result is a PSF consistent with a per-pixel FOV ("PPFOV") that is diffraction limited.

COMPLICATIONS DUE TO SPECTRAL CONSIDERATIONS—For some applications of our invention it is desirable to image scenes having broad spectral content. Wavefront equalization to obtain diffraction-limited performance at the mirror array, however, can only be provided for some relatively narrow spectral band at a time.

Accordingly our invention contemplates imaging and analyzing the overall spectral content of a scene on a stepwise basis: the mirror-array optical-phase adjustments are stepped among desired wavelengths λ in the overall broad band of interest. Meanwhile at each selected wavelength λ the Fabry-Perot etalon or other spectral filter is tuned to pass only that wavelength, over some relative bandpass Δλ/λ, to the focal plane—thereby controlling spectral dispersion.

Two major operating parameters therefore should be characterized and optimized in preparation for practice of our invention:

the maximum relative spectral bandpass Δλ/λ that can be allowed through the spectral filter, when the MEMS-mirror array is adjusted for minimum diffraction at a given wavelength λ, before there is unacceptable degradation in the overall system radiation transfer; and analogously the maximum FOV that the system can accommodate, when the MEMS array is optimized for a given FOR, before there is unacceptable degradation in the overall radiation transfer.

As previously noted, the pathlengths will vary for different field angles off the array.

Results of these investigations depend upon detailed specifics of the MEMS array, and of the wavelengths and FOR of interest. All such solutions, or operating-parameter sets, are within the scope of the present invention.

FURTHER CALIBRATION-CHANNEL DETAILS—The calibration channel 62-68 facilitates measuring the point-spread function for a collimated auxiliary laser source 61 that is reimaged onto a dedicated focal plane. A radiation beam 62 from that source reflects at a dichroic beam splitter 23—the same one that transmits the imaging channel—and is thereby directed to the mirror array 59 along substantially the same optical path 63 as followed by the imaging beam 15 in leaving the array.

The mirror array accordingly reflects the calibration beam 63 at substantially the same angle as the incoming central field ray in the imaging channel. The calibration beam reflects at a second dichroic splitter 33—which may be (not shown) simply another portion of the first splitter.

The twice-reflected calibration beam 65 next reaches a diffraction grating 34 with a square grid array. The grating is chosen and oriented so that, regardless of the MEMS scan angle, some one 67 of the diffracted orders 66 from the grating falls within the FOV of the reimaging lens 35 in the calibration channel.

Accordingly that particular grating order is focused on the calibration-channel focal plane 36 and detector. Thus the purpose of the grating is simply to ensure that some radiation from the calibration source in fact reaches the calibration detector, no matter where the imaging-channel FOV 74 is pointed within its FOR 76.

To complete the calibration procedure, the system processor-controllers then incrementally shift each MEMS mirror in turn, in each of its three degrees of freedom, and record resulting changes in the calibration-channel PSF. The processor then evaluates each change—in particular whether it is favorable or unfavorable to approaching the theoretical diffraction limit, and how strongly so. These influence indications are then used in automatically generating a command vector (i.e. an overall set of control signals for all the mirrors in all their degrees of freedom), driving the system toward that theoretical limit.

An alternative approach for keeping the calibration laser beam within view of the calibration focal plane is to use a liquid lens, such as previously mentioned, to "tilt" the line of sight in order to maintain the return on the focal plane. The lens thus helps correct for phase error due to collimated rays in the calibration channel at extreme MEMS angles—corresponding to operation with extreme field locations, reflected by the MEMS array. This effect will be discussed further, later in this document.

Figure 17:
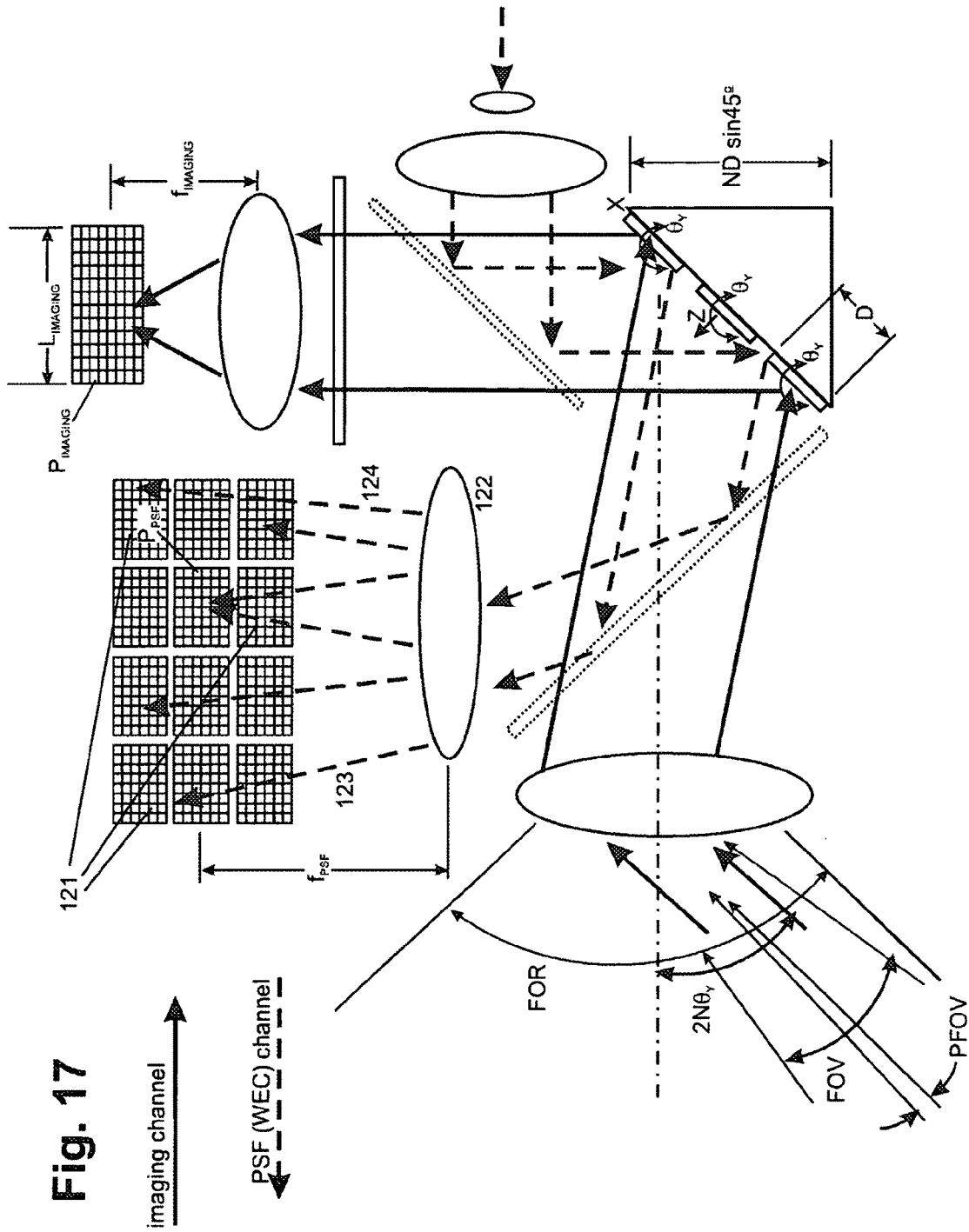
FIG. 17 is a view like FIG. 1 but with an array of sensors (instead of a single sensor) each having, e. g., roughly the size of the FIG. 1 single sensor—obviating the need for a diffraction grating to steer to the detector calibration-channel rays corresponding in position to representative extreme field rays (it will be understood that this drawing and the following one are particularly highly schematic in that the sensor area is shown extended within the plane of the illustration, whereas in actuality both the array and the individual sensors are extended in and out of the plane of the paper, for generally normal impingement of the radiation upon the sensors; the sensors in FIGS. 1 and 19 are drawn similarly)
Figure 18:
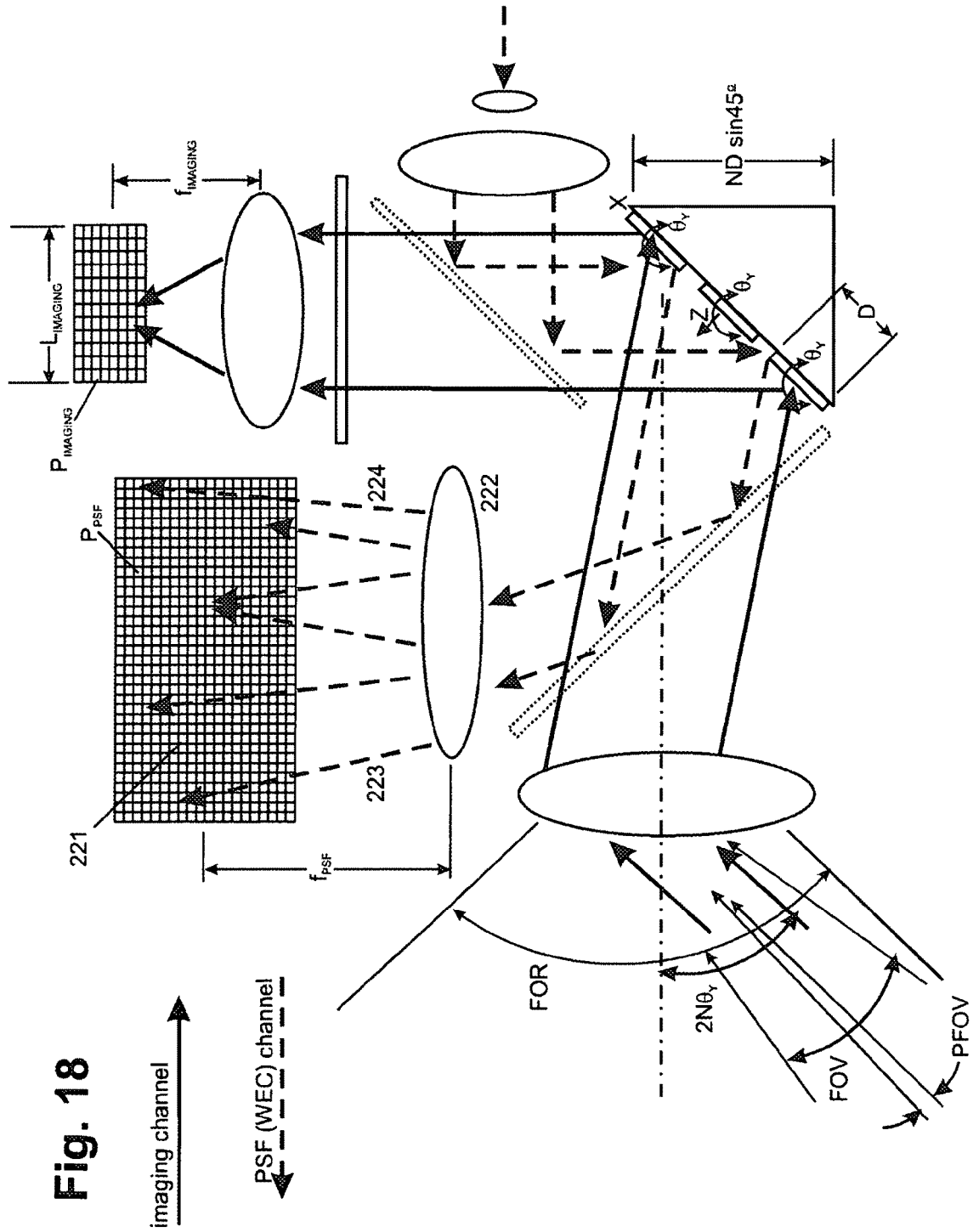
FIG. 18 is a like view but with a relatively very large sensor in lieu of the FIG. 17 array.

Still other approaches include using an array 121 (FIG. 17) of detectors, rather than just one detector, in the focal plane (with a suitable optic 122 to collect extreme rays 123, 124)—or using a very large detector 221 (FIG. 18, again with optic 222 for rays 223, 224). In either of these cases the overall detector surface is sufficiently extended to intercept calibration-channel rays at all MEMS angles—i.e., corresponding to capture of imaging-channel rays from all field positions in the system field of regard. These arrangements are somewhat disadvantageous in terms of system size and weight.

Yet another approach calls for mounting the optic 322 (FIG. 19) and detector to a carriage C that is adjustable in a field-position selecting direction $R_1$ and in a focal direction $R_2$. This facilitates two-stage operation:

(1) setting 331 (FIG. 20) the apparatus for low magnification, and nominally centered on the FOR, and then with those settings rough location 332 of a calibration-channel ray (e. g. corresponding to MEMS settings for an extreme-field-position object), followed by (2) reconfiguring 333 the optics for precise measurement 334 of its PSF at higher magnification.

As will be understood, this arrangement has a drawback of relatively slow mechanical response by the carriage, as well as bulk and weight; hence other solutions may be preferable—such as, for example, adaptations of progressive electrooptical imaging-channel systems introduced in coowned patent documents mentioned earlier.

Thus our invention encompasses several approaches (FIG. 1 and FIGS. 17 through 20) to providing some means for directing calibration-source radiation to the calibration sensor—even when a selected field region, in the imaging channel, is in an extreme portion of such scene. The several directing means are quite diverse, exemplified by a grating, liquid lens, array of sensors, large sensor, and staged calibration system.

OTHER FEATURES AND TECHNIQUES—Preferred embodiments of our invention are superior in spectral bandwidth, throughput efficiency, rapid maneuverability of the pointing system, and various other characteristics, in comparison with devices based upon other emerging technologies. For example active SLM devices, particularly well-regarded now in astronomical applications, call for a factor of 1000 more in the number of piston-only elements—to correct for a given wavefront error—when compared to an array with tip/tilt/piston capability.

A MEMS array currently under development for implementation of the present invention obviates shortcomings of the arrays described earlier. In fabricating that array it has become particularly helpful to employ high-aspect-ratio techniques for silicon-on-insulator ("SOI") MEMS structures, and to facilitate adding additional independent degrees of freedom of operation.

Such motions include both upward and downward vertical pistoning motion as well as bidirectional rotation. Now, in addition to various in-plane SOI-MEMS actuators, inertial sensors, and other enhancements, designers can approach the more difficult problem of tip-tilt (two-axis) micromirrors for laser beam steering.

In recent years, a redirection of the MEMS world toward optical applications of micromachined devices has pushed MEMS fabrication away from its earlier surface-micromachining technology. This is mainly due to a combined need for optically very flat and smooth structures in close conjunction with large deflections and large actuation forces available using high-aspect-ratio micromachining.

SOI-based MEMS technique has become increasingly interesting recently as a platform for a variety of optical applications. By adapting SOI technology to the context of the present invention, the difficulties in obtaining fine-quality flatness are mostly eliminated.

Accordingly the biggest remaining obstacle in SOI-MEMS is now the converse—i.e. inherent lack of out-of-plane motion. Until very recently SOI-MEMS actuators have provided only motion in the wafer plane; this was regarded simply as a characteristic of the technology. Now, however, various optical applications in telecommunications, as well as in biomedicine, require new out-of-plane degrees of freedom—in addition to the earlier in-plane x-y displacement of SOI-MEMS structures.

For optical applications such as scanning micromirrors, various approaches may provide the additional degrees of freedom—particularly rotation of micromirrors about single or double axes, and micromirrors with independently controlled rotation and piston motion. These motions in turn can be produced by fabricating either (1) vertically displaced structures that convert in-plane actuation to out-of-plane actuation and rotation, or (2) vertical comb drives that directly convert electrostatic force to rotation.

Figure 2:
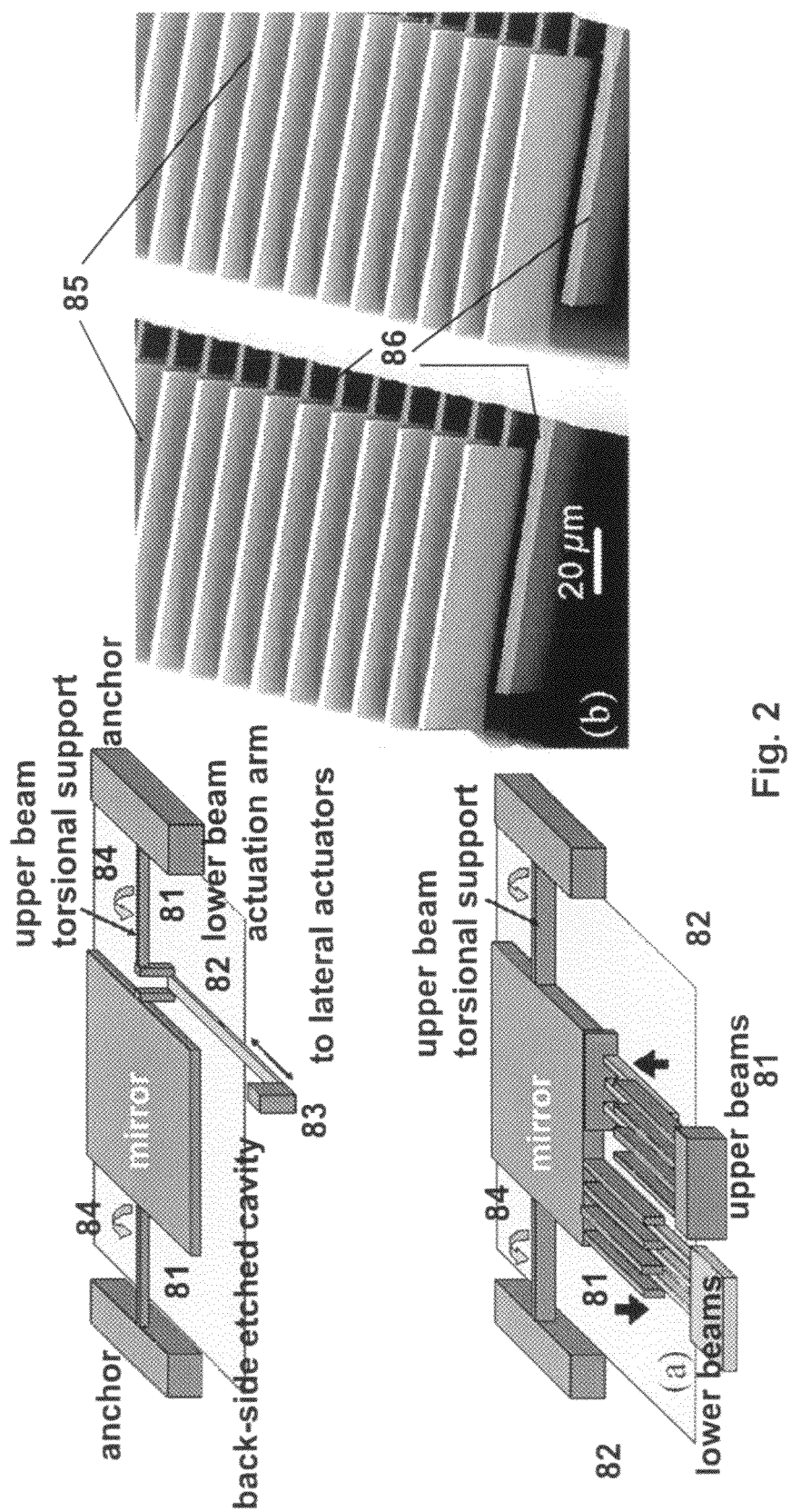
FIG. 2(a) is a pair of mechanical diagrams of multilevel-beam applications implemented in a silicon-on-insulator ("SOI") device layer; and 2(b) is a photomicrograph of actual manufactured assemblies to implement the same.

Thus in some preferred embodiments of our invention vertically displaced structural beams 81, 82 (FIG. 2[a]) convert lateral motion to rotation; or vertically displaced structural beams 85, 86 (FIG. 2[b]) in the device layer of a vertical comb drive directly produce rotation (and even vertical actuation) from electrostatic force.

Vertically staggered SOI comb drives perform well for single-sided rotations, and have advantages of SOI-MEMS over surface-micromachined vertical comb drives. In these previous processes, however, no isolation is available between comb-drive fingers in either upper or lower comb drives, limiting these devices to one-sided rotation.

Rotation of such devices therefore is accompanied by undesired downward and lateral actuation due to the electrostatic force; this is undesirable for phased-array applications. Lastly, the upper and lower comb-finger sets are separated by the thickness (~1 µm) of insulating oxide, requiring large biasing (pretilting) of devices before the comb-fingers are adequately engaged. Instead, preengagement of vertical comb-fingers is much more highly desirable—particularly for well-behaved performance at relatively low actuation voltages.

SOME FABRICATION CONSIDERATIONS—A preferred manufacturing embodiment for our invention is a multimask SOI process alleviating the above limitations:

(1) comb fingers are all formed in the device layer—enabling isolated, independently powered vertical comb-drives and thereby independent up- or down-pistoning and bidirectional rotation;

(2) comb-fingers are timed-etched to provide several microns of preengagement (overlap);

(3) support beams can be any desired thickness for lower-voltage operation, with rotation optimized vs. vertical pistoning compliance;

(4) masks for etching of comb-fingers are self-aligned by a single mask; and (5) structures are made in monolithic single-crystal silicon for repeatable and reliable operation.

Such technology was first demonstrated several years ago, followed by a number of generations of improvements. Various fully monolithic silicon optical scanners with tip-tilt-piston actuation have been demonstrated, with high static optical-beam deflection. A main advantage of the scanners is high speed in both axes.

Various single-axis and two-axis devices have been successfully made and tested, in all cases with 600 µm micromirrors. Single-axis micromirrors achieve static optical-beam deflections exceeding 20° and peak-to-peak resonant scanning of over 50°—e.g. at resonant frequency of 4.4 kHz.

Many two-axis devices utilizing four actuators have been tested, and exhibit static optical deflection exceeding 20° at under 150 V. Their lowest resonant frequencies are above 4.6 kHz for both axes.

This technology is scalable, and applicable to phased micromirror arrays. The same designs, with above-described microfabrication technology, have been used to make small tip-tilt-piston actuators that can be arranged in high-fill-factor arrays for adaptive optics.

Preliminarily, tip-tilt-piston devices have been scaled down to 0.6×0.6 mm and 0.4×0.4 mm, for high-speed and high-fill-factor phased optical arrays. Preferred embodiments of our invention will use scalable arrays (e. g. 32×32 elements or more) with fill-factor over 96% and with settling time, in both rotation and pistoning, under 100 µsec. Preferred embodiments of our invention contemplate several microns of pistoning and 40° of total optical-beam deflection, for each element.

OVERALL SYSTEM PERSPECTIVE—Preferred embodiments of our invention, as explained above, neutralize phase errors that arise at the MEMS array to improve imaging sharpness. Such compensation can be achieved, as set forth in our previous patent documents, by measuring wavefront errors and then making opposite adjustments—or, according to the present invention, by measuring the PSF in a beam reflected from the array at the same angular settings, and then perturbing the overall set of mirror settings to minimize or sharpen that PSF.

Relevant to this latter approach is the stochastic-based sensor of Weyrauch, mentioned above. This approach is not a wavefront sensor, but evaluates the system image quality directly. The stochastic approach, very generally analogous to a neural network, continually trains itself to achieve the desired image metric—as by minimizing the radius of the image PSF.

As implemented in preferred embodiments of the present invention, the system extracts a portion of the incoming image with a beam splitter and focuses that portion onto a high-speed VLSI detector array. For each time step, each element in the active mirror element is perturbed and the resulting influence on the image metric quality is recorded. Given the resulting "influence function", a command vector is given that optimizes the resulting quality metric.

Table 1 summarizes requirements for operating preferred embodiments of the invention. The invention is capable of use for many different purposes and in many different kinds of applications. As the system is extremely compact, light and rugged, it can function at top performance in virtually any kind of facility, vehicle or environment.

The imaging approach in preferred embodiments of the invention is believed to be workable from the visible part of the radiation spectrum through the long-wave infrared. These embodiments advantageously provide a 120° circular FOR and 2.5° FOV with 375 µrad PPFOV, although other ranges are within the scope of the invention as delineated by the appended claims.

Practical limits on FOV size are constrained by optical phase error—which increases at the edge of the field. The PPFOV is limited by entrance pupil of 10 mm, setting the ratio of λfn/p equal to 1. Smaller magnification would result in a larger pupil—but the MEMS array would only be able to address a smaller FOR. Pupil diameter is equal to the MEMS scan-mirror array diameter divided by the afocal lens magnification, as noted earlier.

TABLE 1

AMBS sensor-system concept requirements

| characteristic | value |
|---|---|
| imaging channel: | |
| spectral bandpass | 0.4 to 11 µm |
| | 3 to 5 µm first analysis |
| field-of-regard (FOR) | 120° circular |
| field-of-view (FOV) | 2.5° |
| per-pixel field-of-view (PPFOV) | 375 µrad |
| national imagery interpretability rating scale (NIIRS analog)* | 4 (at 3 km from object) |
| entrance pupil diameter | 10 mm |
| focal length | 80 mm |
| afocal magnification | 3 |
| MEMS scan mirror array diameter on-axis | 32 mm |
| | (32 × 45 mm at 45°) |
| MEMS mechanical scan angles $\theta_X, \theta_Y$ | ±10° |
| MEMS piston range, Z | >5 µm |
| MEMS closed-loop control bandwidth | >10,000 Hz |
| MEMS mirror size | 1 × 1 mm |
| imaging frame rate | 10 Hz |
| calibration channel: | |
| calibration laser wavelength | $\lambda$ = 633 nm |
| MEMS angular intercept range $\theta_X, \theta_Y$ | ±20° |
| MEMS degrees of freedom monitored | 1440 $\theta_X$, 1440 $\theta_Y$, 1440 Z |
| MEMS command solution bandwidth | >10 Hz |

Our specification of 32 mm×45 mm for our initial MEMS scan-mirror array is based on what is felt to be achievable in the next five to ten years in terms of technology development. Except where otherwise expressly indicated, it is not intended to limit the scope of the invention as indicated by the appended claims. Practical limits of array size are subject to empirical investigation.

Analogously, tip/tilt of ±10° is within range of what has been done to-date, and by no means an ultimate limit. Larger mirror deflection is desirable, as it would permit use of smaller afocal magnification to address the 120° FOR. Piston of 5 µm allows for optical phase control for wavelengths up to 10 µm.

Closed-loop control bandwidth exceeding 10 kHz, already achieved, allows for step response on the order of tens of microseconds. This capability is very highly desired, in order to measure the influence of each MEMS-mirror degree-of-freedom on our PSF analyzer within our goal of 10 Hz for imaging frame rate. Also highly desired is integration period of 10 msec—which fixes the available time between frames for updating of the MEMS-array figure by the PSF sensor, and fixes the LOS stabilization period too.

As mentioned previously the laser wavelength used in the calibration channel is advantageously out of the imaging-channel spectral band in order to share the common path. A wavelength of 632 nm is desirable for relative ease of aligning visible sources, as well as lower cost of associated elements in future configurations. The eventual optimum choice depends upon the effect that the calibration wavelength has upon other subsystems, within our preferred embodiments.

Given the specified MEMS mechanical scan angle of ±10° about each axis, the calibration-channel focal plane must be able to intercept an incoming laser angle of ±20°. The associated sensor must be able to assess the influence by each one of the 4320 degrees of mirror-array freedom upon the measured PSF, advantageously within the 10 Hz frame rate. The resulting MEMS-actuator command vector should then be calculated and provided to the closed-loop control system as a correction input, also within that frame rate.

We believe that preferred embodiments of the present invention are capable of performance equal to or better than traditional imaging and sensor systems in all important regards, including for example the overall system modulation transfer function ("MTF"). Since a MEMS array can only be optimized in phase by modulo 2π for a single wavelength $\lambda_i$ at a time, now-preferred embodiments of the invention step through different phase settings to address all wavelengths of interest.

Other operating techniques are available and within the scope of the invention. Some approaches, merely by way of example, include operation of parallel subsystems in different wavelength bands, and rapid canvass at a representative wavelength followed by automatic determination of wavebands of particular interest and wavelength-selective operation thereafter. People skilled in this field will recognize that still other paradigms can be employed. Dispersion modeling can determine how wide a spectral band pass $\Delta\lambda$ about $\lambda_i$ results in acceptable levels of degradation.

Although a best set of mirror-array control signals, or control "vector", can be selected for each pointing direction of the FOV within the FOR, it should be recognized that phase variation occurs for light reflected by the array from different field locations. This phase variation, in general, cannot be canceled by the mechanisms of our preferred embodiments.

Figure 3:
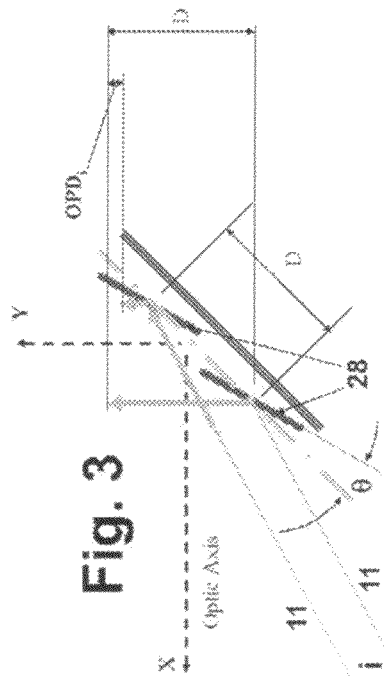
FIG. 3 is an optical diagram showing how optical path difference ("OPD") arises as a function of field location on a MEMS array, as in the FIG. 1 system.

Consider, for instance, rays 111 (FIG. 3) from a particular (but generalized) field location i—reflecting at two adjacent MEMS mirrors 28. These mirrors have been rotated to direct the rays perpendicular to the incoming optic axis X—i.e., to reach the filter 24 (FIG. 1) and image plane 26.

Due to this rotation there arises an optical phase difference, corresponding to the associated pathlength difference $OPD_i$ from the particular field point i. Piston adjustment of the MEMS scan mirrors can force the phase for this field point—and sometimes a limited family of related conjugate field points—to meet the modulo 2π criterion for the desired wavelength.

Rays from still other field locations, however, once the array is optimized for field location i, cannot satisfy the modulo 2π criterion. At their corresponding image points, image sharpness is degraded.

Figure 4:
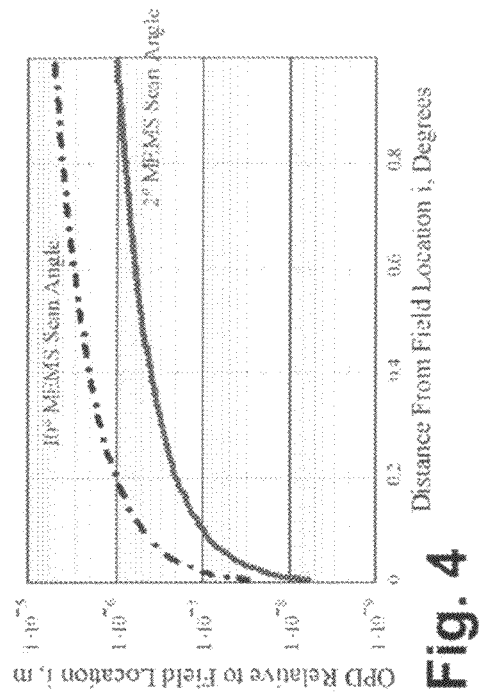
FIG. 4 is a graph of resulting OPD versus field location for the same system.

As examples, OPD as a function of field location i for MEMS mirror rotation angle θ (FIG. 4) of 2° and 10° can result in unacceptable imaging elsewhere in the field. For purposes of discussion only, we assume that 1 µm of phase error at the edge of the field is acceptable for a system operating at λ=5 µm (such relationships are readily determined experimentally). In consequence a maximum half angle of 0.2° can be accommodated by the sensor before imaging quality becomes unacceptable. Given afocal magnification of 3, the resulting FOV is 1.2°.

As mentioned earlier, a liquid lens with adjustable focal length over the FOV—and an SLM used as a phase retarder, or another type of retarder—can be investigated for extending the FOV.

ADDITIONAL IMAGING-CHANNEL DETAILS—Based on the optical parameters described above, we have developed a paraxial optical system design 21, 23-26 (FIG. 5). The large barrel distortion (change in focal length with field angle) typical for wide-angle lenses is beneficial to limiting the MEMS mechanical angle required to scan the FOR.

In this case, the MEMS scan angle required to accommodate the FOR of such a lens is a few degrees less than if there were no distortion. Design tradeoffs, such as magnification vs. FOR (also PPFOV and FOV), should be thoroughly investigated and optimized in any final design.

Careful consideration should be given to the imaging optic 25 to ensure adequate performance, particularly in correcting for the above-discussed variation of OPD with FOV. While this is not a challenge in a static environment, correction under dynamic circumstances may be nontrivial. Several techniques and technologies are promising, including a novel liquid lens discussed below.

ADDITIONAL CALIBRATION-CHANNEL DETAILS—Here too we have developed a paraxial design 31, 32, 23, 33-36 (FIG. 5), as an example, based on the parameters presented earlier. As in the imaging channel, design tradeoffs such as optical performance (e. g. PSF and MTF) vs. MEMS mechanical scan angle should be thoroughly investigated and optimized. Special emphasis should be given to the calibration-channel imaging element(s) to ensure adequate performance, particularly in achieving high-fidelity in terms of PSF versus MEMS mechanical scan angle.

Figure 6:
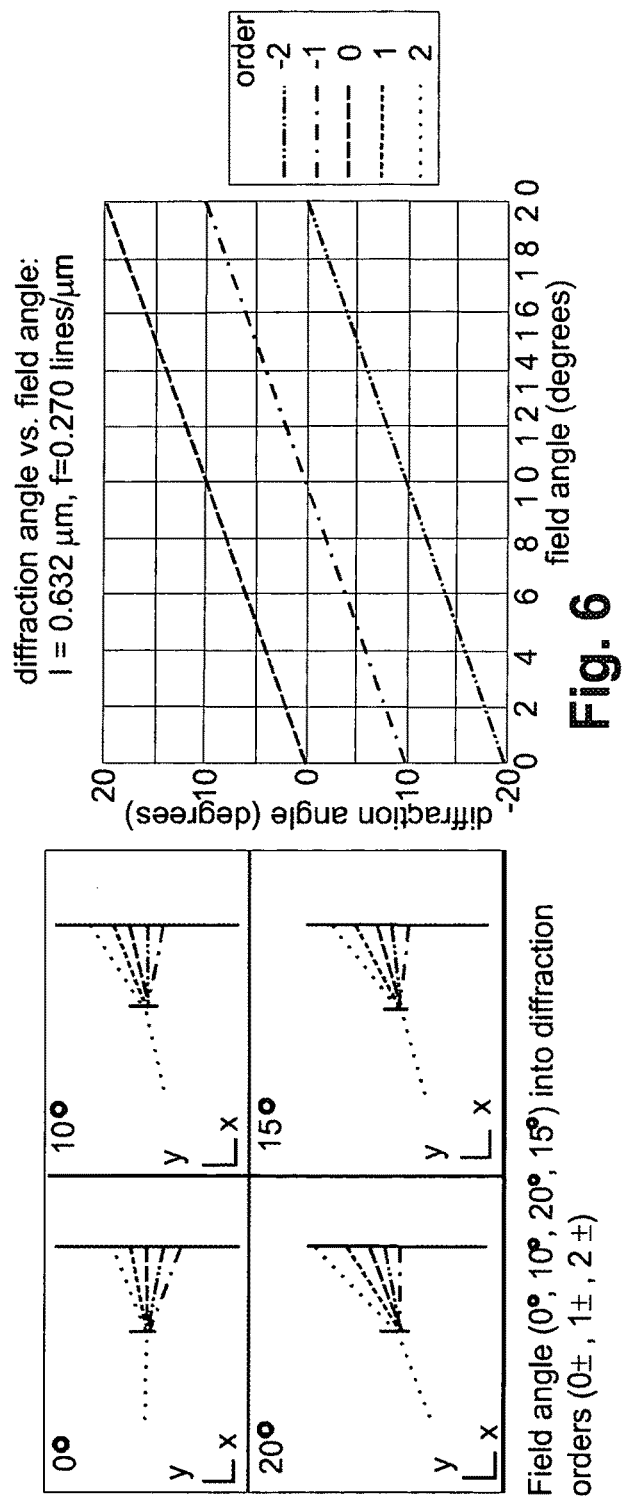
FIG. 6 is a set of four diagrams and a related graph, all showing the relationship between calibration-channel diffraction grating order and scan angle for the same system.

Several techniques and technologies are available. A diffraction grating 34 and PSF imaging optic 35 are parts of this exemplary design. Our initial model incorporates a grating to capture the beam from the maximum MEMS mechanical scan angles with the 0, ±1 and ±2 orders (FIG. 6). Except for scan angles which fall on an integral order (0, 5, 10 degrees), the diffracted angle is positive. This deviation impacts the PSF quality. Other candidates for this element include a volume hologram, a diffractive/refractive hybrid, and the novel liquid lens.

CALIBRATION CLOSED-LOOP CONTROL ALGORITHM—Preferred embodiments of our invention incorporate PSF determination for a reference wavelength $\lambda$. This calculation yields additional information about the orientation of the mirrors in the MEMS array.

These auxiliary data are useful in developing closed-loop control for finer resolution in a general MEMS optical system by correcting mirror positions. Using a MEMS-array model, a brute-force correction method can be implemented straightforwardly:

Precise mirror dispositions can be estimated by computing simulated PSFs for many different mirror orientations, then finding the one with the best least-squares fit to the reference PSF. This would give the "influence function", i.e. the mirror correction necessary for improving the optical system resolution, albeit with significant computational power and time requirements.

Preliminary investigation into a closed-loop control algorithm fortunately suggests that there exist far better solutions than the brute-force method. For the simplified case of a one-dimensional MEMS array consisting of two 0.5 mm mirrors, an easy and efficient algorithm exists for correcting diffraction effects resulting from some mirror orientation errors, strongly suggesting the same for the problem of interest:

First consider the piston motion of the mirrors, where the two mirrors remain parallel and are offset only in the normal direction. A piston error in the mirror disposition induces a path difference in the reflected light which degrades the image quality of the optical system.

Figure 7:
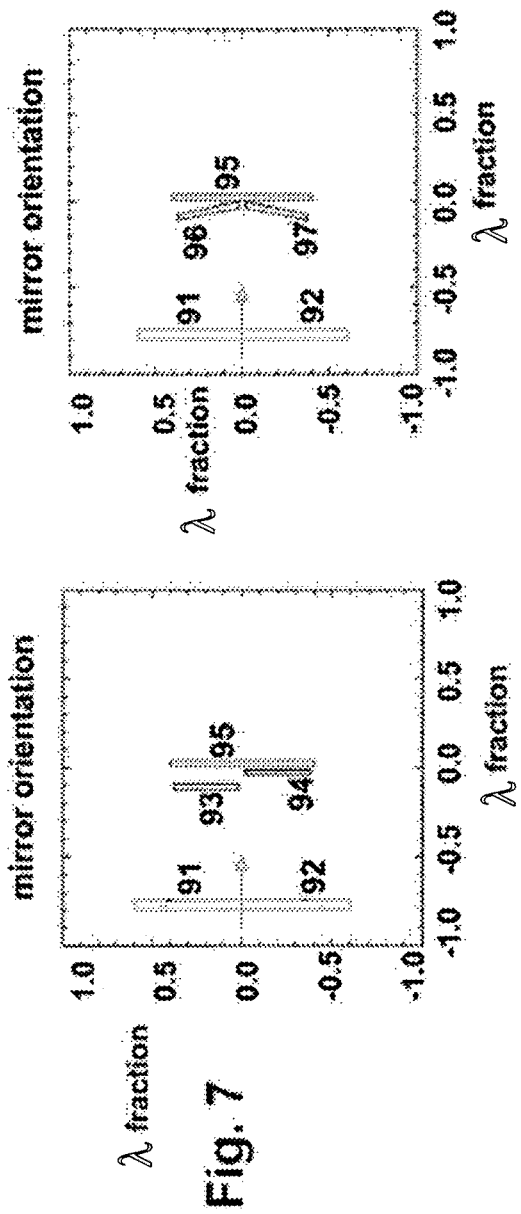
FIG. 7 is a pair of diagrams of piston and tilt error examples, respectively, generated by MEMS simulation software, for the same system.
Figure 8:
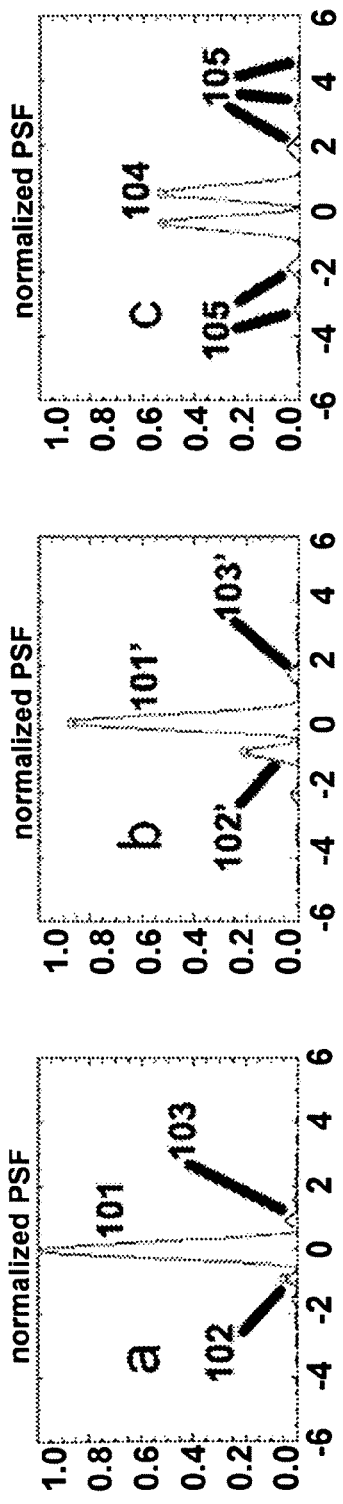
FIG. 8 is a triplet of graphs of modeled PSF for generalized wavelength $\lambda$, due to piston errors of 0, 0.125$\lambda$ and 0.25$\lambda$—in the (a), (b) and (c) views, respectively—for the same system.

When the array is aligned 95 (FIG. 7), the expected since profile PSF (where $$\mathrm{sinc}(\theta) \equiv \frac{\sin(\theta)}{\theta}$$

is equivalent to that of a single 1 mm mirror. Changing this alignment in piston by 0.125$\lambda$, with input wavefronts 91, 92 aligned, or 0.25$\lambda$ results in interference between the reflections 93, 95 from the two mirrors, broadening the PSFs.

Each PSF has primary 101 and secondary 102, 103 intensity peaks. When the pathlength difference equals an integral number of wavelengths the side-lobe peak 102, 103 has $(0.217)^2$ the height of the main peak 101, but this ratio changes as the mirrors move out of phase.

Figure 9:
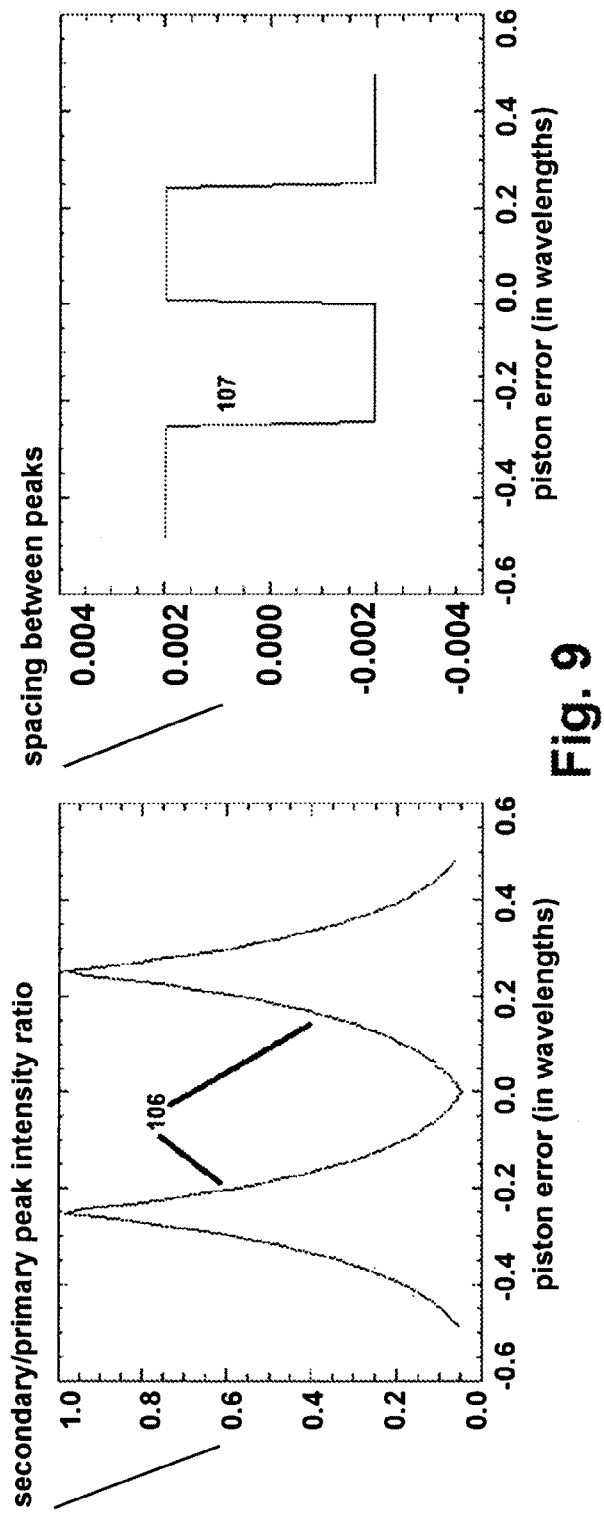
FIG. 9 is a like pair of graph of simulated ratio and spacing of peak PSF intensities, respectively, vs. piston error.

More specifically, the ratio between primary 101' and secondary peaks in PSF intensity changes smoothly 106 (FIG. 9) as the mirrors operate in the piston direction. The peak ratio is clearly a smooth function of the piston error, and is $\lambda/2$-periodic because the pathlength difference is twice the piston error.

This ratio is easily calculated and is a simple feature of the measured PSF—allowing for a good estimate of the piston error in the current mirror dispositions. Applying equal and opposite piston motion can be used in a closed-loop control to improve the performance of the MEMS optical system.

The necessary piston correction appears to be a multivalued function of the measured peak intensity ratio 106 (FIG. 9); however, this complication can be overcome by remembering the $\lambda/2$-periodicity of the mirror orientation and using the spacing 107 between the primary and secondary peak PSF intensities as an additional parameter that gives the sign of the relative piston error.

At some spacings the primary peak 101 splits. It becomes two approximately equal and separated peaks 104, with satellites 105 at both sides.

An equally interesting and useful relation arises when the two mirrors have tilt error—i.e. the mirrors are aligned so the pathlength difference from the centers of the two mirrors is an integral multiple of $\lambda$, but the tilt angles of the mirrors result in more complicated diffraction effects.

Figure 10:
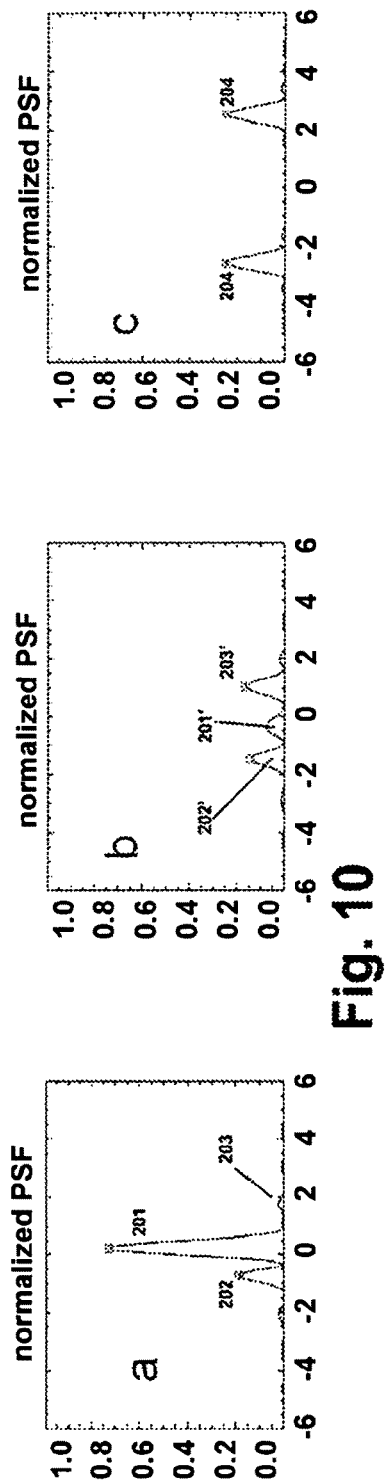
FIG. 10 is a triplet of like graphs, of modeled PSF resulting from tilt errors of 0.0003, 0.001 and 0.0025 radians, in the (a), (b) and (c) views, respectively.

If the mirrors 91, 92 (FIG. 7, right-hand view) are pointing in exactly the same direction, once again the above-mentioned 1 mm mirror $\mathrm{sinc}^2$ profile results (with "sinc" defined as above). If the mirrors point in nearly the same directions 96, 97, diffraction effects occur as suggested by satellites 202, 203 (FIG. 10a) flanking the central peak 201. As the mirror directions diverge more, however, these diffraction effects become complex, with a diminished primary peak 201' and greater satellites 202', 203'—eventually producing essentially two smaller since profiles 204 (FIG. 10c), one from each mirror.

Figure 11:
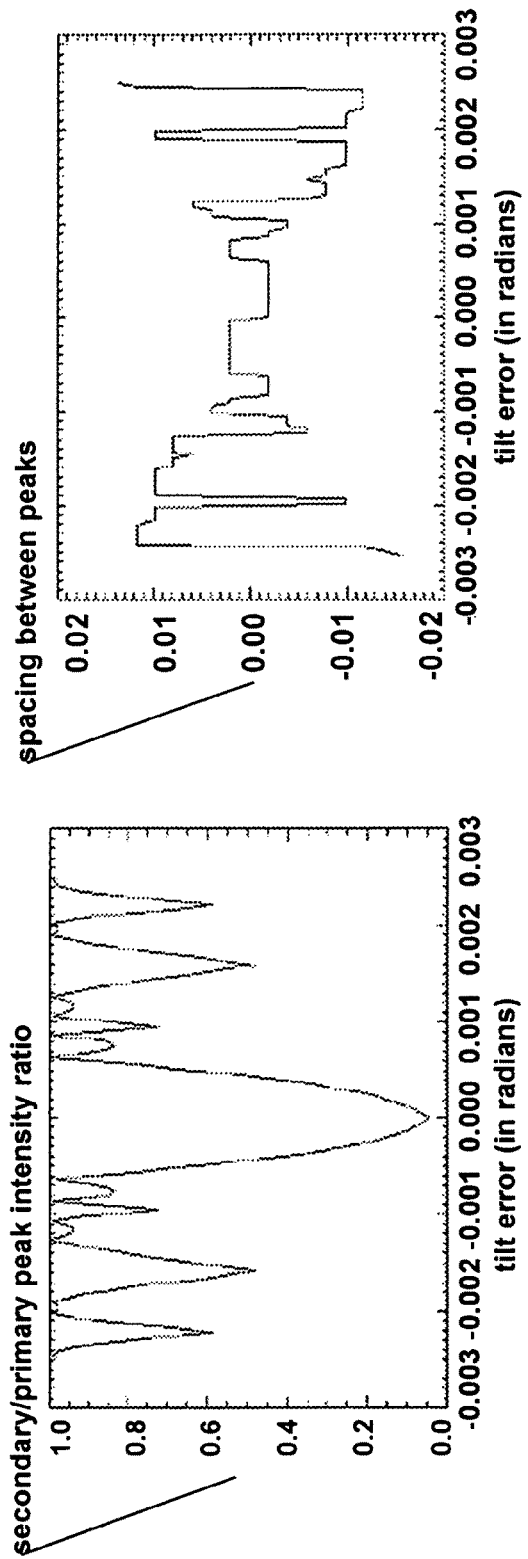
FIG. 11 is a like pair of graphs of simulated ratio and spacing (in the left and right views respectively) of peak PSF intensities vs. tilt error.

The approach here follows that used earlier—namely, employing the ratio 206 (FIG. 11) and spacing 207 of the peak PSF intensities as the parameters in a closed-loop control system for improving the MEMS-system imaging. When the magnitude of the tilt error is smaller than about 600 μrad, the combination of the peak intensity ratio and spacing will allow an unambiguous mirror-correction estimate, analogously to the piston-error case discussed above. Because the peak intensity ratio does not vary as smoothly for tilt error larger than 600 μrad, an initial correction calculated solely from the peak spacing moves the system into the former small-tilt-error case.

PSF broadening for a tilt error of 300 μrad is similar to that for piston error of 0.125$\lambda$, and the same is expected for any small tilt error. Fortunately, simulation of the 0.125$\lambda$ correction vector applied to a 300 μrad mirror misalignment yields an improved PSF, thus pointing to mathematical and physical symmetries that can be exploited to give a more computationally efficient closed-loop control algorithm. A quick-search tree algorithm applied to precomputed PSFs of a much smaller parameter space represents a good first cut at an applicable closed-loop control algorithm.

This initial examination can be expanded to include combined piston and tilt errors for a 2×2 array, and the algorithm tested using a MEMS array of that size. In addition it is advisable to study a mathematical model for an arbitrary number of mirrors, beginning with the one-dimensional case and moving to a realistic number of dimensions.

MEMS SCAN-MIRROR ARRAY APPROACH—For simplicity of early development, the array in preferred prototype embodiments of the invention is relatively modest, based on a two-axis array currently under development: all electronics, other than the embedded capacitive rotation sensors, are off chip. In a next stage of development we anticipate using a similar configuration, but with addition of a piston-control capability traceable to an operational array.

An orderly development of this part of the invention can proceed through an operational MEMS array concept, so that in a next stage the mirror array can be operationally scalable. In an operational system, drive high-voltage amplifiers and inner-loop proportional-integral-derivative ("PID") controllers for each mirror in the array should be on chip.

TABLE 2

Operational MEMS scan-mirror array requirements

| parameter | requirement |
|---|---|
| individual scan mirror clear aperture | 1 mm × 1 mm |
| total mirrors in array, distributed along x-y axis with all scan axes parallel | x-y array of 32 × 45 |
| mechanical scan angle about $\theta_X$, $\theta_Y$ | ±10° |
| mechanical piston | 10 μm |
| minimum first-mode frequency about $\theta_X$, $\theta_Y$ and Z | >1000 Hz |
| minimum mirror radius about either X or Y axis | >5 m |
| mirror reflectivity, for λ = 0.5 mm to 5 mm | >95% |
| mirror to substrate areal density | >95% |
| embedded rotational sensor requirements: | |
| angular range about $\theta_X$, $\theta_Y$ | ±8° |
| angular resolution about $\theta_X$, $\theta_Y$ | 150 μrad |
| angular measurement error about $\theta_X$, $\theta_Y$, 1σ | 150 μrad |
| measurement bandwidth | 100 kHz |
| embedded piston sensor requirements: | |
| piston sensor range in Z | 10 μm |
| piston sensor resolution | 0.005 μm 1σ |
| piston sensor measurement error | 0.005 μm 1σ |
| scan-mirror control: | |
| step overshoot after settling time | <4% of step size |
| time to settle within allowable error | <100 μs |
| MEMS voltage driver | CMOS on-chip or equivalent |
| MEMS local-loop control | 10 kHz closed-loop control |
| electrical command interface | digital serial |
| environment: | |
| operational temperature | −30 to 80° C. |
| shock loading | 100 g |

Figure 12:
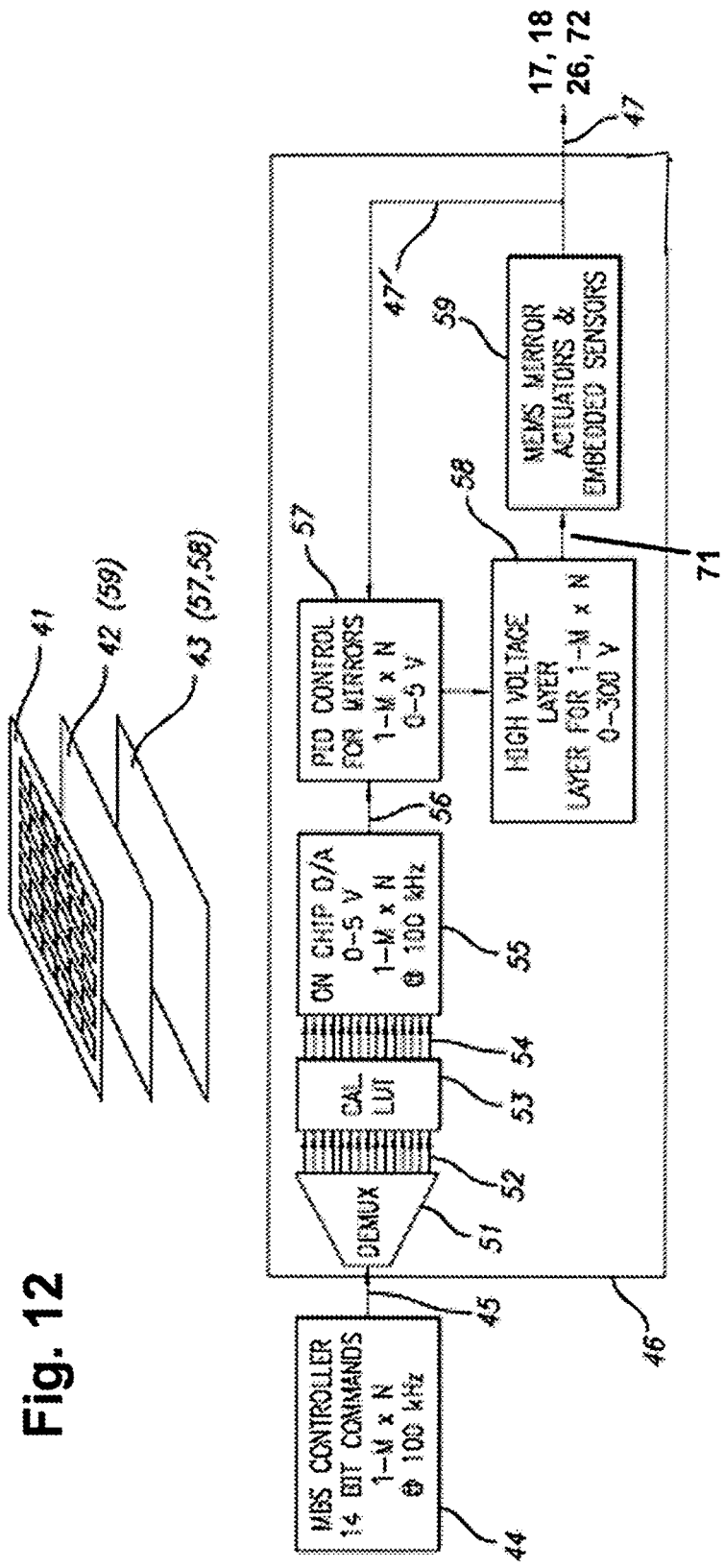
FIG. 12 is a relatively low-level diagram, highly schematic (and duplicated from a coowned, recently published PCT application), of operational MEMS mirror-array control-electronics architecture, for the FIG. 1 system.
Figure 13:
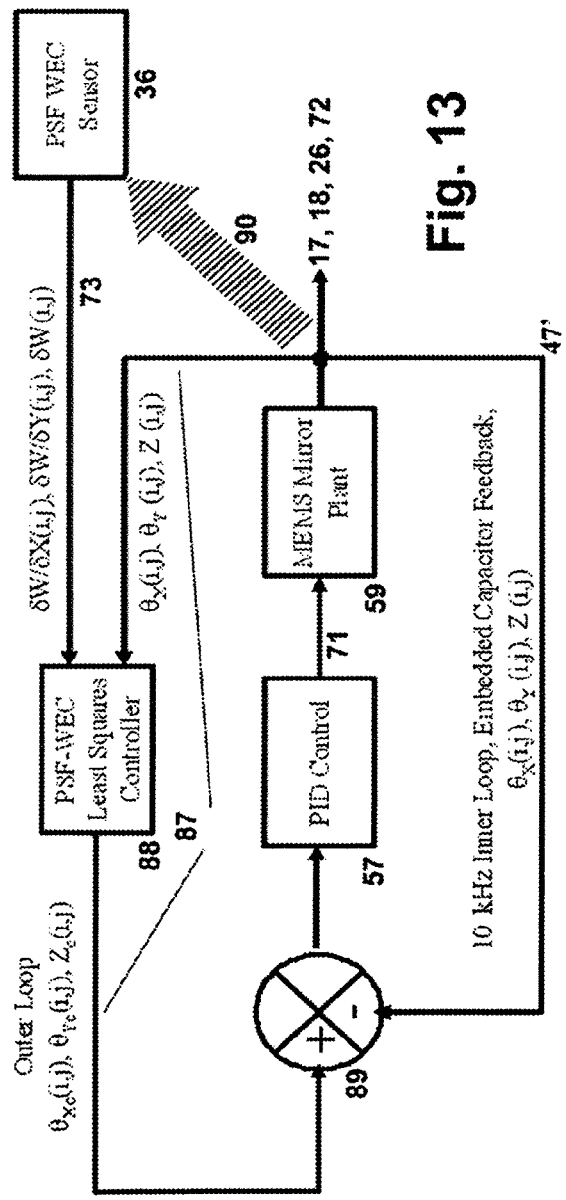
FIG. 13 is a like but relatively higher-level (and likewise duplicated) diagram of AMBS closed-loop control-electronics architecture.

At that later stage each mirror should be addressable through a respective serial interface. Requirements and goals for the array are outlined in Table 2. Commands to the MEMS Scan Mirror array are advantageously through a digital serial interface 43-46, 47', 51-58 (FIGS. 12, 13). Laboratory evaluation of these MEMS-array characteristics is advisable: open-loop resonances, tip/tilt/piston range, and voltage/angle range.

CLOSED-LOOP CONTROL—Closed- rather than open-loop operation of the MEMS array is advantageous for two principal reasons. First, a closed-loop system utilizing variations of PID control can attain bandwidths 10 to 100 times the fundamental mechanical natural frequency of the MEMS array, whereas an open-loop approach, in most implementations, is limited to the first mode.

A second major reason for closed-loop control is that gains of individual actuator elements in the array vary by as much as 10%, resulting in positional error equivalent to several wavelengths. Part of the variation in gain among elements is constant and could be compensated in a calibration lookup table.

Much of the variation, however, is temperature and time sensitive (a function of the aging in the electronics), for which such a table is not practical. The integration portion of a PID closed-loop control system significantly reduces gain-variation effects: regardless of gain, the array will be driven to take on the needed wavefront error-correction shape.

AMES control architecture for preferred embodiments includes a 10 kHz inner PID loop 47', 57, 58, 71, 59 (FIGS. 12, 13) using embedded capacitive sensors 59 for feedback, and an outer loop that includes the inner loop plus additional signal paths 87 through a PSF least-squares controller 88 and summation stage 89. The overall architecture thereby generates tip/tilt and piston commands for the actuators 59 of each mirror in the mirror plant. Control is thus based on a least-squares error minimization solution, utilizing the influence function 90 measured by the PSF sensor 36. We have operated high-bandwidth (3 kHz) PID control of a two-axis mirror.

Figure 14:
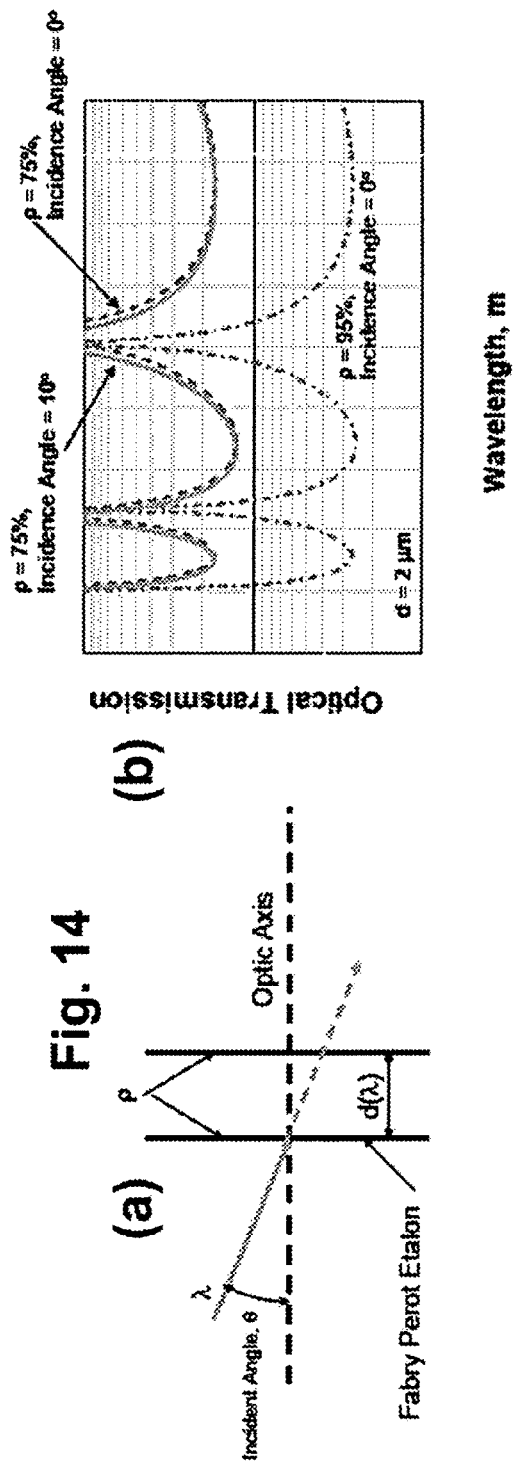
FIG. 14 is a pair of optical diagrams generally like FIGS. 1 and 3, of an adaptive Fabry-Perot etalon for use in the system of FIG. 1.

FABRY-PEROT ETALON—To limit the spectral dispersion at the imaging channel focal plane, in preferred embodiments the MEMS array is set to modulo 2π for only the desired central frequency, as mentioned earlier. The etalon (FIG. 14, left-hand view) establishes the spectral bandpass.

The distance between the etalon interference plates, d(λ), is controlled based upon the desired central wavelength λ. Tradeoffs should be selected to optimize the geometry and surface reflectivity ρ of the etalon.

A plot of etalon transmission versus wavelength (FIG. 14[b]) shows how reflectivity (95% and 75%) can be reduced to broaden the spectral band pass Δλ/λ. The etalon is relatively insensitive to incidence angle $\theta_{INCIDENCE}$ (FIG. 14[a]) for ρ=75% and incidence angles of 0 and 10°. As a result, FOVs of interest for the AMBS system are compatible with the etalon-bandpass-filter approach.

LIQUID-LENS OPD vs. FOV COMPENSATION—Since the MEMS array is set for a central wavelength and field angle, as described earlier an OPD error arises as a function of FOV, relative to the set field point. Our invention contemplates two alternative approaches to correct for this effect.

In one, a fluidic-based lens provides a zoom capability. Preferred embodiments of our invention, however, can operate in the infrared as well as visible; therefore a question arises whether such a lens can operate with an infrared-transmitting fluid. Also, it is uncertain whether such a liquid lens can scale from current aperture diameters of 3 to 5 mm to preferred diameters, for the AMBS system, of 30 to 40 mm.

The alternative approach is an SLM to adjust phase as a function of FOV. Given problems of wavelength specificity, this approach may not be a likely solution.

SYSTEM PERFORMANCE MODEL—For effective practice of preferred embodiments of our invention, analyzing a system-level performance model is advisable. Such modeling is best based upon the well-known general image-quality equation, which nowadays is accepted throughout environmental and industrial optics (see e. g. Leachtenauer et al., 36 *Applied Optics* No. 32 at 8322 (Nov. 10, 1997).

This step is very helpful for comparison of AMBS performance against a traditional gimbaled system. Additionally, such a model is advantageously utilized to develop transfer-function allowances for degradation due to spectral dispersion and the FOV mentioned earlier, as well as other major system elements impacting the transfer function.

Practice of the present invention, for small to midsize business entities not having in-house facilities for fine MEMS fabrication, may hinge upon availability of effective collaborators.

Figure 15:
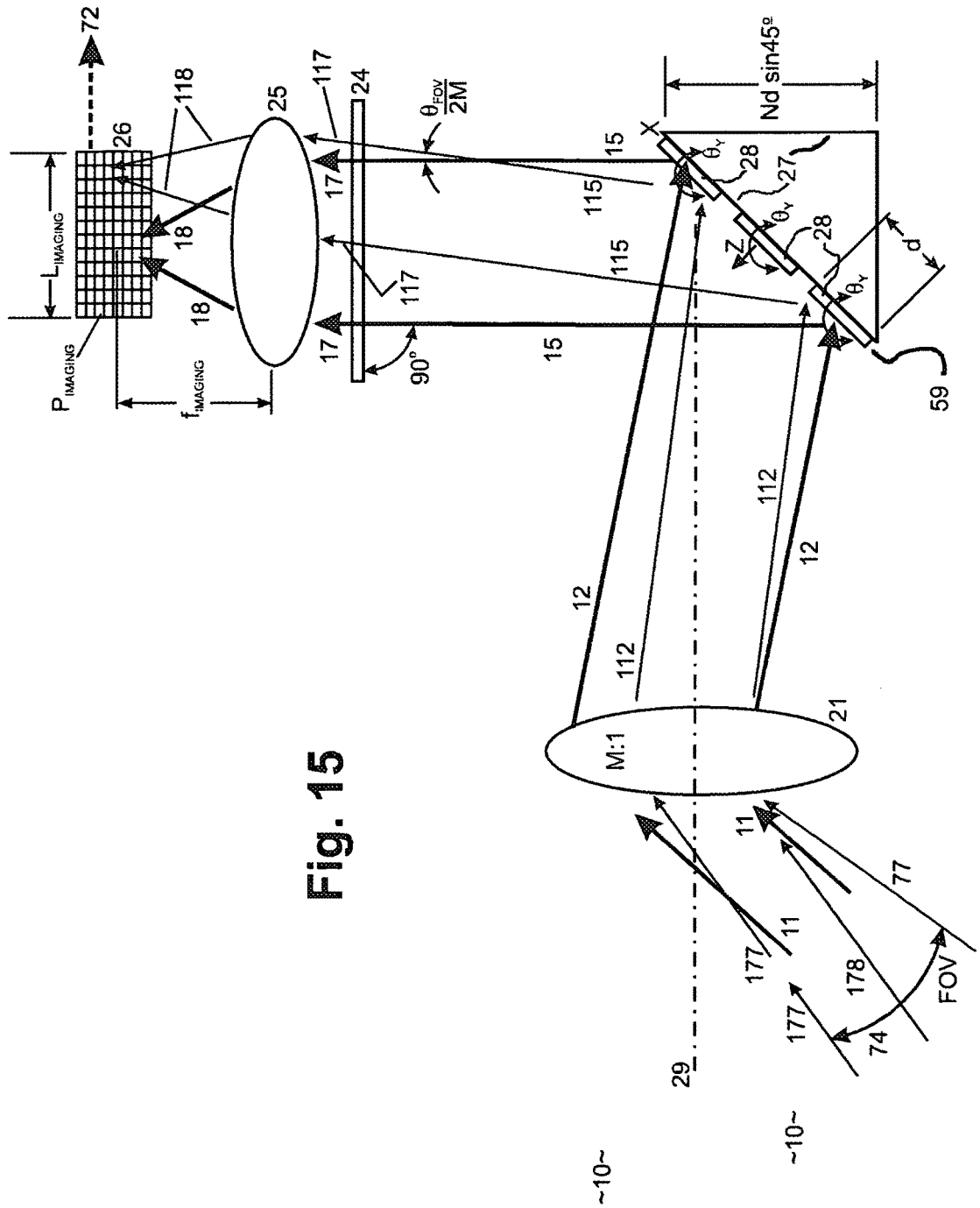
FIG. 15 is an optical diagram generally like FIG. 1 but emphasizing how the invention accommodates incoming rays along a central edge of the FOV—particularly when those rays reach optical elements (such as a spectral-filter etalon, or a polarization filter) between the MEMS array and the reimaging lens, and also when they reach the imaging detector.

ADVANTAGES OF THE AMBS SYSTEM WITH RESPECT TO FOR ANGLE AT SPECTRAL OR POLARIZATION FILTERS—The AMBS sensor architecture described here and in earlier patent documents has certain advantages that may not yet be completely apparent. Associated with each individual pixel $P_{IMAGING}$ of the detector array 26 (FIGS. 1, 15) is a separate FOV called, in this document, the "per-pixel FOV" or PPFOV (and in some other publications the "instantaneous FOV" or IFOV).

The PPFOV establishes the smallest image-sampling size possible with the AMBS system. Preferred embodiments of our invention use at least one spectral or polarization filter 24, or both, to search for and identify an object based upon its spectral or polarization radiance signature.

Regardless of the FOR usable by the AMBS sensor, the central-angle rays 11, 11 in the FOV 74 are normal to the filter 24. Rays 177 (FIG. 15) along the upper edge of the FOV—and also other received rays 178 that are parallel to those FOV upper-edge rays—all have an incidence angle equal to $$\frac{q_{FOV}}{2M},$$

where $q_{FOV}$ is the angle between the system centerline 29 and the upper one of the two rays 77 (FIG. 1) that define the angle "FOV"; and M is the angular magnification of the afocal lens. Since the like rays 177, 178 (FIG. 15) are parallel to the extreme upper edge of the FOV, this expression represents the maximum angle relative to the normal to the filter 24, in this configuration.

This maximum angle, however, is quite small, particularly in comparison with the maximum angle relative to the filter normal in a conventional (nonAMBS) configuration. The latter angle is $\theta_{FOR}/2$, which could be more than an order of magnitude larger.

The rays 177, 178 propagate beyond the afocal lens 21 as parallel rays 112 to the MEMS array 59, and then further as parallel rays 115 to and through the filter 24. After the filter, these extreme rays continue as parallel rays 117 and focused rays 118 to pixels near the edge of the detector array 26.

In either configuration, the maximum angle of incidence at the filter is especially significant as it establishes both the lateral extent of the filter 24 that is needed to capture all the rays 115, 117, and also the broadening of spectral or polarization bandpass that occurs at the filter 24.

For a nonAMBS conventional system, in the case of a spectral filter (particularly interference-based filters such as dichroics or Fabry-Perot etalons) the spectral bandpass is very broad and varies with the field location. In the case of gas cells or polarization cells, the cell diameter has to be significantly larger to accommodate the FOR.

HYBRID CONFIGURATIONS—Previous discussion in this document describes an internal calibration channel to measure the impact of the MEMS scan-mirror array on the PSF. Regardless of the wavelength of observation, relative slope-error correction for calibration purposes can be corrected using essentially any wavelength—given optics 31, 32, 35 suitable for the wavelength of interest.

Our invention, however, also encompasses provision of a laser reply beam 161, 163-165 (FIG. 16), propagating in the opposite direction to that of the incoming source beam. The reply beam can be injected directly into the main optical path using a beam splitter 23 substantially equivalent to that used for the calibration channel, but possibly having different spectral properties to accommodate the wavelength of the reply beam.

Figure 16:
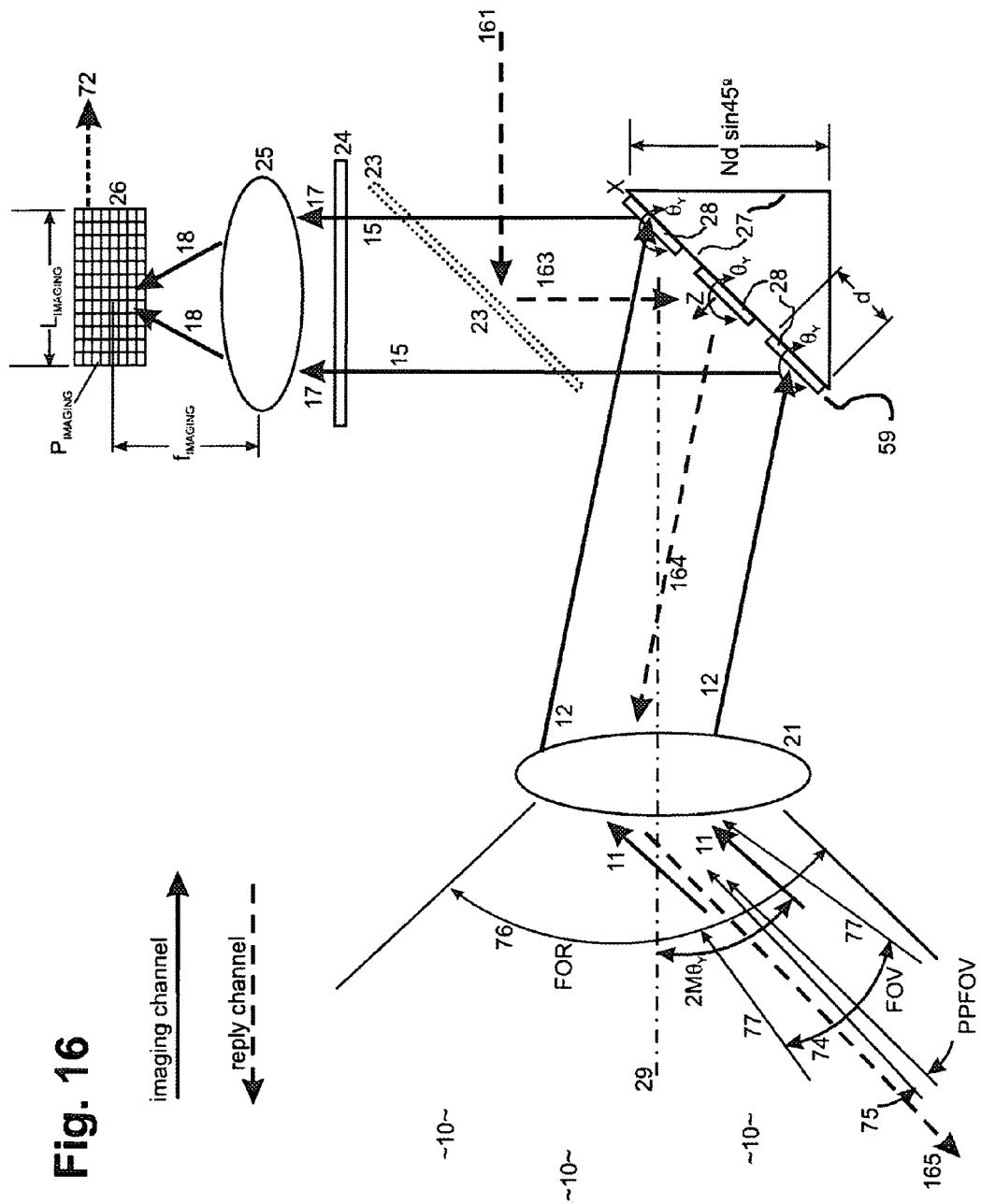
FIG. 16 is yet another like diagram but for a different preferred embodiment of the invention.

It is also within the scope of the invention to combine these two features (combination not shown), i.e., calibration channel and reply beam. For this purpose the second beam splitter 33 is advantageously selected to reflect the calibration beam 64 (FIG. 1) but transmit the reply beam 164 (FIG. 16).

In that case, then—after relative slope relationships for wavefront correction have been determined using the wavelength of the internal calibration channel 61-68—the relative piston of the MEMS mirrors should be readjusted to achieve the modulo $2\pi$ relationship at the wavelength of that reply beam 161, 163, 164. The necessary readjustment is calculated straightforwardly from the relationships determined for the calibration wavelength.

CONCLUSIONS

As generally noted above, the detector array 26 performs these functions:

It is used to sense an object's irradiance that is in-band either spectrally or in terms of polarization.

It is used in a closed-loop control feedback sensor for the MEMS array, to drive the incoming irradiance to a known line-of-sight ("LOS") location in the AMBS imaging system when the correct signature is detected. This location, coupled with the known MEMS angles, reveals the incoming LOS angle relative to the optical system.

Once the correct signature is detected from the object of interest, the resulting point spread function ("PSF") from the image of the object in the focal plane is used, in concert with determining the influence of each MEMS-mirror degree of freedom upon the PSF, to determine a command set (or command vector) that minimizes the size of the PSF.

This last function could also occur for an objective of minimizing the PSF is to create a MEMS array with modulo $2\pi$ phase alignment at the desired wavelength and correct for any wavefront slope error resulting from the angular misalignment of the MEMS mirrors from each other. The result of minimizing both wavefront slope and phase error is that diffraction behaves as if the effective system aperture, at the MEMS array, is the entire array—rather than the many small apertures of the many individual mirrors.

Accordingly the diffraction-limited beam divergence for a laser source reflecting at the MEMS array, and out of the AMBS system, is determined by the nominal size Nd sin 45° of the overall array, not the smaller diameters d of the individual MEMS mirrors that form the array.

In summary particularly as to these last two sections, for purposes of preferred embodiments of our invention:

(1) a spectral filter can be any of these, or combinations:
  a Fabry-Perot etalon that can be fixed at a single desired bandpass, or actively controlled to pass different wavelengths in a sequence, or configured as a FFT spectrometer;
  a dichroic filter; or a gas cell allowing specific wavelengths to pass;

(2) a polarization filter can be any of these, or combinations:

magnetic filters;
a Bragg cell; or
a Pockels cell; and (3) benefits include:

coverage of a large FOR while the incoming angle relative to the filter-surface normal is one or two degrees, or less—allowing for very narrow spectral bandpass and a relatively smaller-diameter Pockels- or Bragg-cell chamber than if the optics covered the entire FOR without FOV steering;

high frame rate for revisiting the overall FOR, e.g. 100 to 1000 Hz with FOR exceeding 100 degrees; and a very compact overall package.

As set forth above, preferred embodiments of the invention use a MEMS mirror array as a means for steering the radiation beams in the imaging and calibration channels. Although a MEMS array is the most highly preferred means, other devices can be substituted—as, for example, other types of DMs including SLMs with suitable modification to overcome the limitations outlined earlier. It is expected that still further devices will be invented and become available, and these too are within the scope of the invention.

Likewise, most highly preferred embodiments use a diffraction grating as a means for directing calibration-source radiation to the calibration sensor even when such selected region is in an extreme portion of such scene. A grating is particularly advantageous for this purpose, since its several orders can be used to provide optical communication between the calibration-channel source (e. g. laser) and the calibration-channel sensor—even when the beam-steering device is set to address the imaging-channel sensor to a particular FOV (or scene region) that is in a relatively extreme field position, i.e. location within the FOR (or overall scene).

It is preferable to arrange the grating so that the beam from the source strikes the grating and the various orders proceed to the sensor; however, in principle the grating orientation can be reversed so that the various orders are received from the source, and the single central beam proceeds to the sensor. A grating is also desirable for use as directing means because the grating, in all of its orders that are employed, adequately preserves phase relationships between the source and sensor.

The invention, nonetheless, is not limited to use of a diffraction grating for the directing means; rather, the invention is amenable to substitution of any other device that is capable of providing optical communication at diverse angles corresponding to multiple field positions, including some that are extreme—provided that adequate phase maintenance can be maintained. Such alternative devices include, for example, those shown in FIGS. 17 through 20 and discussed in the corresponding text passages above.

Still further, the invention preferably includes some means for minimizing imaging degradation due to diffraction in the imaging channel—and these means in turn preferably include means for modifying wavefront error and smoothness at the steering means, in the imaging channel. In the most highly preferred embodiments of the invention, these minimizing and modifying means comprise means for measuring sharpness of a point-spread function, in the calibration channel, and for refining settings of the beam-steering means, as used in the calibration channel, to optimize measured sharpness of that point-spread function, and also for applying sharpness measurements, and calibration-channel steering-means settings, to refine steering-means settings for use in the imaging channel.

It will be understood, however, that other systems or methods for providing such minimizing or modifying means are within the scope of the invention. These may for example include stochastic systems that measure and minimize or maximize radiation behind a pinhole, analogously to those in Weyrauch—or, other arrangements, either now known or yet to be invented, for controlling diffraction-induced imaging degradation, preferably by enhancing wavefront angle and smoothness.

In the currently preferred embodiments, the measuring, refining and applying means comprise some means for performing an iterative multidimensional gradient search to find optimum steering-means settings for the calibration channel. Once again, such an iterative multidimensional search is not a requirement of the present invention, and can be replaced by other algorithms or apparatus for optimization—such as for example a power-frequency analysis, a lookup-table method, a linear programming technique, or a "greedy search" algorithm.

Preferred embodiments also include at least one beam splitter for enabling the imaging channel and calibration channel to share the imaging-channel path at the steering means, either simultaneously or for particular angular settings of the steering means. Within the scope of the invention, however, other devices may be substituted for enabling such sharing.

In certain of the appended apparatus claims, the term "such" is used (instead of "said" or "the") in the bodies of the claims, when reciting elements of the claimed invention, for referring back to features which are introduced in preamble as part of the context or environment of the claimed invention. The purpose of this convention is to aid in more distinctly and emphatically pointing out which features are elements of the claimed invention, and which are parts of its context—and thereby to more particularly claim the invention.

The foregoing disclosure is not to be understood as limiting or exhaustive. Rather, it is only exemplary of the invention, whose scope is to be determined from the appended claims.

We claim:

1. Apparatus for imaging radiation from a selected region of an external scene, and comprising:
   an imaging channel having an imaging sensor;
   beam-steering means for deflecting such radiation, along an imaging-channel path, to address the imaging sensor to such region;
   a calibration channel having a radiation source and a calibration sensor; radiation from the source being deflected by the steering means to the calibration sensor, along said imaging-channel path; and
   means for directing calibration-source radiation to the calibration sensor even when such selected region is in an extreme portion of such scene.

2. The apparatus of claim 1, wherein:
   the directing means comprise a diffraction grating.

3. The apparatus of claim 2, wherein:
   plural orders of the grating communicate between the calibration source and the calibration sensor when such selected region is in plural different portions of such scene, respectively.

4. The apparatus of claim 3, wherein:
   the calibration channel comprises means for minimizing imaging degradation due to diffraction in the imaging channel.

5. The apparatus of claim 1, wherein:
   the calibration channel comprises means for minimizing imaging degradation due to diffraction in the imaging channel.

6. The apparatus of claim 5, wherein:
the minimizing means comprise means for modifying wavefront error and smoothness at the steering means, in the imaging channel.

7. The apparatus of claim 6, wherein the modifying means comprise means for:
measuring sharpness of a point-spread function, in the calibration channel;
refining settings of the steering means, as used in the calibration channel, to optimize measured sharpness of said point-spread function; and
applying sharpness measurements, and calibration-channel steering-means settings, to refine steering-means settings for use in the imaging channel.

8. The apparatus of claim 7, wherein:
the measuring, refining and applying means comprise means for performing an iterative multidimensional gradient search to find optimum steering-means settings for the calibration channel.

9. The apparatus of claim 6, wherein:
the steering means comprise a MEMS mirror array.

10. The apparatus of claim 9, further comprising:
an afocal lens receiving such radiation from such scene and magnifying, at such scene, the deflection introduced by the steering means.

11. The apparatus of claim 1, further comprising:
at least one beam splitter for enabling the imaging channel and calibration channel to share the imaging-channel path at the steering means, either simultaneously or for particular angular settings of the steering means.

12. A method of imaging an FOR on an imaging sensor, by using a MEMS array to deflect radiation along a path from the FOR to the sensor so that the sensor addresses an FOV that is within and narrower than the FOR, and using an afocal lens to enlarge deflections by the array in such a way as to cover the entire FOR; said method comprising the steps of:
refining the imaging quality at said sensor by minimizing degradation due to diffraction at the array;
said refining step comprising passing a calibration beam from a calibration source along part of said path at the array, and adjusting the array to optimize point-spread function quality at an auxiliary calibration sensor;
then correspondingly adjusting the array to optimize the array with respect to the imaging sensor;
also passing both the radiation from the FOR and the calibration beam through at least one beam splitter, in common, so that both the radiation and the beam share said part of said path, either simultaneously or for particular angular settings of the array; and
also passing the calibration beam through a diffraction grating before the calibration beam reaches the calibration sensor, in such a way that plural orders of the grating communicate between the calibration source and the calibration sensor, respectively, regardless of which particular relatively narrow FOV that the array is set to address.

13. The method of claim 12, wherein the refining step comprises:
measuring sharpness of the point-spread function, at the calibration sensor;
refining settings of the array, as used in passing the calibration beam along said part of said path at the array, to optimize measured sharpness of said point-spread function;
applying sharpness measurements, and said calibration-beam array settings, to refine array settings for use in imaging on the imaging sensor; and
the measuring, refining and applying steps comprise performing an iterative multidimensional gradient search to find optimum array settings for the calibration beam.

14. Apparatus for imaging radiation from a selected FOV within a FOR, and comprising:
an imaging channel having an imaging sensor;
a MEMS mirror array for deflecting such radiation, along an imaging-channel path, to address the imaging sensor to such selected FOV;
a calibration channel for modifying wavefront angle and smoothness at the array, in the imaging channel, to minimize imaging degradation due to diffraction in the imaging channel; said calibration channel having a radiation source and a calibration sensor;
at least one beam splitter for enabling the imaging channel and calibration channel to share the imaging-channel path at the array, either simultaneously or for particular angular settings of the array;
radiation from the source undergoing deflections by the array to the calibration sensor, along said imaging-channel path; and said deflections to the calibration sensor being simultaneous or for a same array setting as said deflecting to address the imaging sensor to such FOV;
an afocal lens receiving such radiation from such FOR and magnifying, at such FOR, the deflection introduced by the array; and
means for directing calibration-source radiation to the calibration sensor even when such selected region is in an extreme portion of such FOR; wherein:
said directing means comprise a diffraction grating;
plural orders of the grating communicate between the calibration source and the calibration sensor when such selected FOV is in plural portions of such FOR, respectively; and
the calibration channel comprises means for:
measuring sharpness of a point-spread function, in the calibration channel,
refining settings of the array, as used in the calibration channel, to optimize measured sharpness of said point-spread function,
performing an iterative multidimensional gradient search to find optimum array settings for the calibration channel, and
applying sharpness measurements, and calibration-channel array settings, to refine array settings for use in the imaging channel.

\* \* \* \* \*